United States Patent
Dilworth et al.

(10) Patent No.: US 8,752,855 B2
(45) Date of Patent: Jun. 17, 2014

(54) ACCESSORY MOUNTING SYSTEMS FOR NON-HIGHWAY VEHICLES

(75) Inventors: Michael Dilworth, Muskego, WI (US); Brad Fromm, Franklin, WI (US)

(73) Assignee: Mibar Products, Ltd., Greenfield, WI (US)

( * ) Notice: Subject to any disclaimer, the term of this patent is extended or adjusted under 35 U.S.C. 154(b) by 1173 days.

(21) Appl. No.: 12/648,399

(22) Filed: Dec. 29, 2009

(65) Prior Publication Data

US 2010/0164202 A1    Jul. 1, 2010

Related U.S. Application Data

(60) Provisional application No. 61/141,087, filed on Dec. 29, 2008, provisional application No. 61/157,038, filed on Mar. 3, 2009.

(51) Int. Cl.
*B62D 49/04* (2006.01)
*A01D 34/66* (2006.01)
*A01B 59/048* (2006.01)

(52) U.S. Cl.
CPC ............ *B62D 49/04* (2013.01); *A01D 34/662* (2013.01); *A01B 59/048* (2013.01)
USPC ........................................................ 280/481

(58) Field of Classification Search
CPC .......... E01H 5/06; E01H 5/063; B62D 49/04; A01B 59/00; A01B 59/04; A01B 59/048; A01B 59/064; A01B 59/006; A01B 59/002; A01D 34/64; A01D 34/661; A01D 34/662; A01D 75/002; A01D 75/006
USPC .................................... 280/477, 481; 56/15.8
See application file for complete search history.

(56) References Cited

U.S. PATENT DOCUMENTS

| | | | |
|---|---|---|---|
| 4,180,282 A * | 12/1979 | Henning | 280/481 |
| 4,760,686 A * | 8/1988 | Samejima et al. | 56/15.8 |
| 5,082,065 A * | 1/1992 | Fletcher | 172/273 |
| 5,381,647 A * | 1/1995 | Eberle | 56/15.8 |
| 6,286,236 B1 | 9/2001 | Bowers | |
| 6,415,872 B2 * | 7/2002 | Myers et al. | 172/21 |
| 6,502,771 B1 | 1/2003 | Wyne | |
| 6,732,811 B1 * | 5/2004 | Elliott | 172/445.1 |

(Continued)

OTHER PUBLICATIONS

Canadian Patent Office Action dated Jul. 15, 2011 (2 pages).

(Continued)

*Primary Examiner* — Joseph M Rocca
*Assistant Examiner* — Daniel Yeagley
(74) *Attorney, Agent, or Firm* — Boyle Fredrickson, S.C.

(57) ABSTRACT

A height adjustable multiple implement mounting system for use with off-road vehicles such as zero-turn lawnmowers. A mount assembly is secured at a forward portion of the vehicle. A space frame extends from the mount assembly and supports one or more ground care implements at a location forward of the vehicle. An electric actuator has a first end that is pivotably connected to the mount assembly and a second end that is attached to the space frame. Operation of the actuator alters the elevation of the implement such that the implement can be moved between in-use and out-of-use positions relative to a ground surface. In a preferred aspect, the mount assembly allows lateral or side-to-side rotation of the space frame and actuator so that the implement can be laterally inclined or pitched with respect to the vehicle.

16 Claims, 34 Drawing Sheets

(56) References Cited

U.S. PATENT DOCUMENTS

| | | | |
|---|---|---|---|
| 6,957,505 B1 * | 10/2005 | Moffitt | 37/231 |
| 7,293,398 B2 * | 11/2007 | Koehn | 56/15.9 |
| 7,448,691 B2 * | 11/2008 | Brooks | 298/17 T |
| 7,476,059 B1 | 1/2009 | Holland | |
| 7,975,407 B2 | 7/2011 | Dilworth et al. | |
| 8,454,046 B1 * | 6/2013 | Hobbs, Jr. | 280/488 |
| 2006/0096133 A1 | 5/2006 | Sanders et al. | |
| 2006/0192359 A1 | 8/2006 | Brooks | |
| 2008/0052968 A1 | 3/2008 | Dilworth et al. | |
| 2009/0045668 A1 | 2/2009 | Brooks | |
| 2009/0178381 A1 * | 7/2009 | Gilles | 56/15.2 |

OTHER PUBLICATIONS

Canadian Patent Office Action dated May 8, 2012 (2 pages).

* cited by examiner

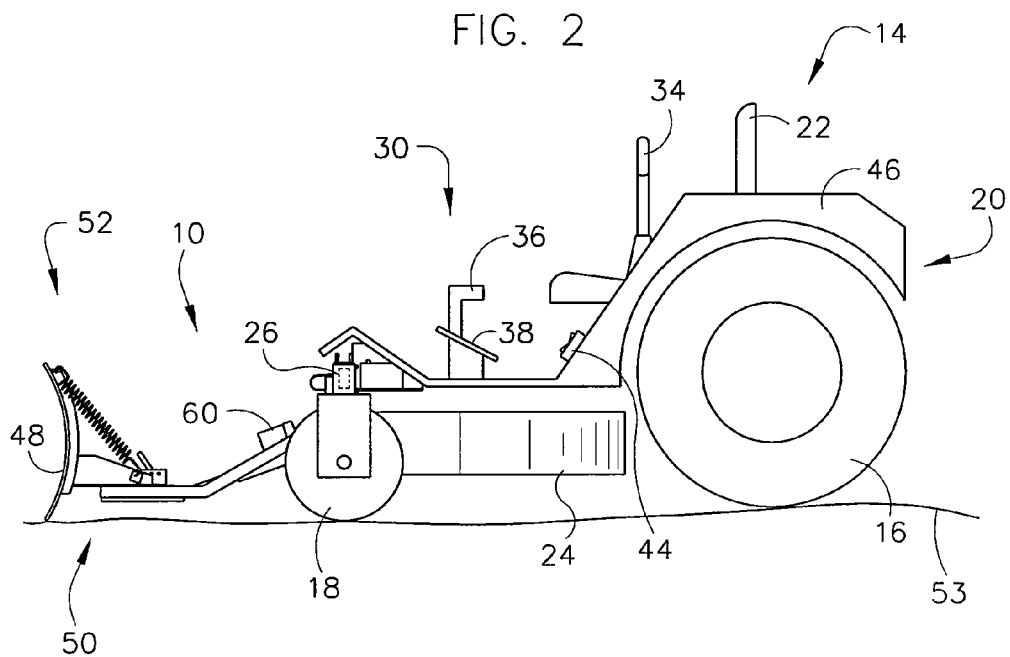
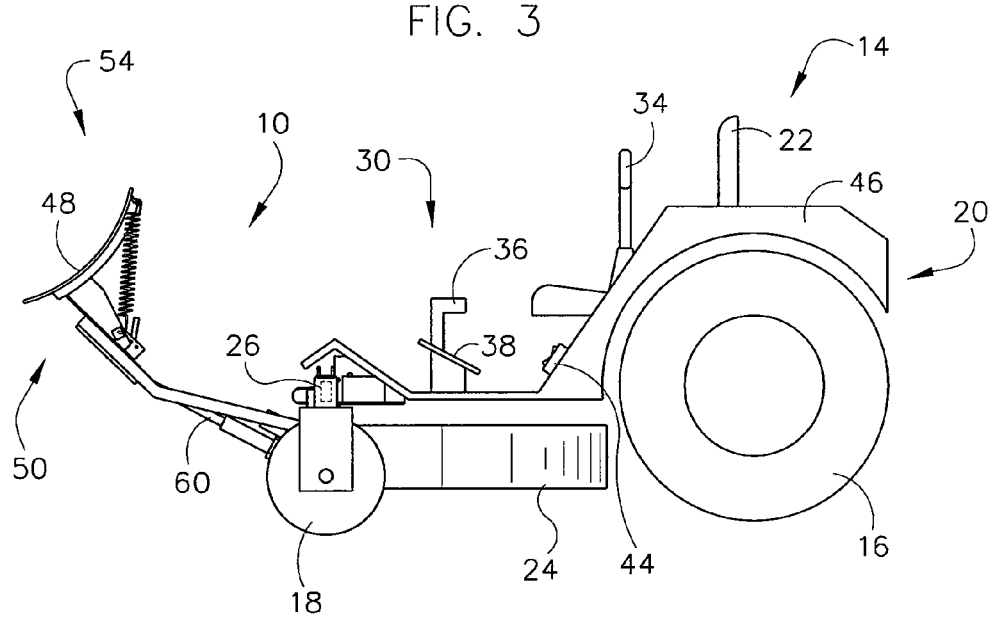

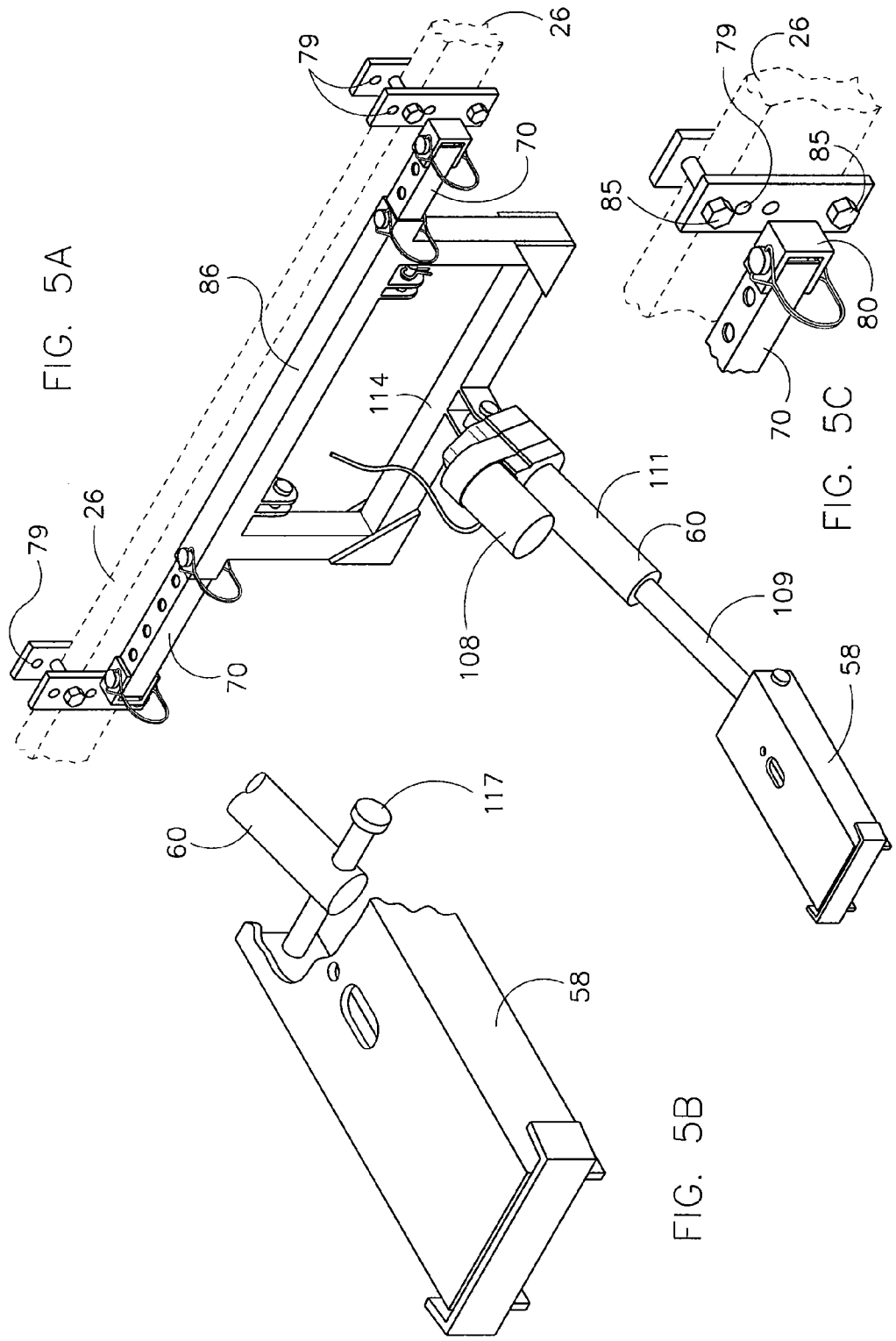

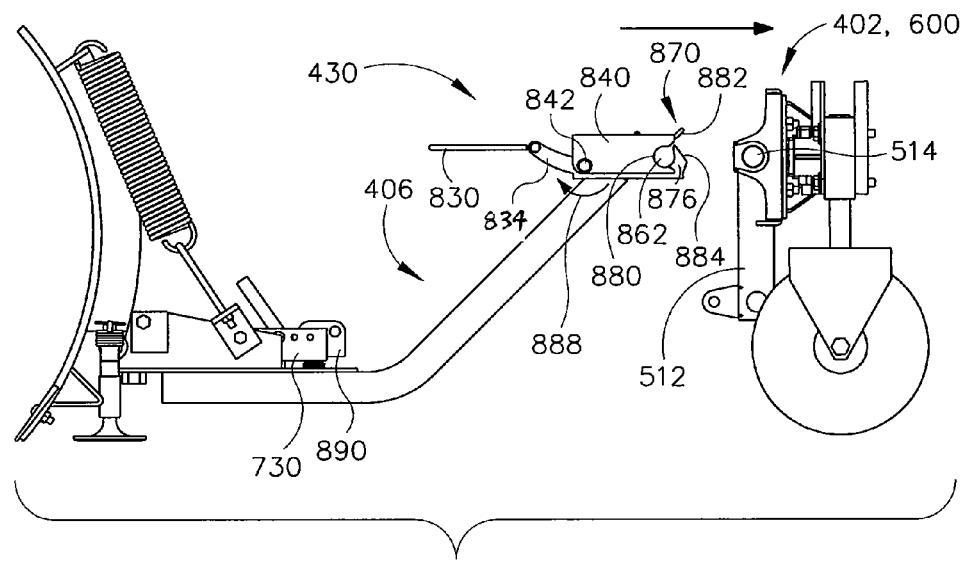
FIG. 33
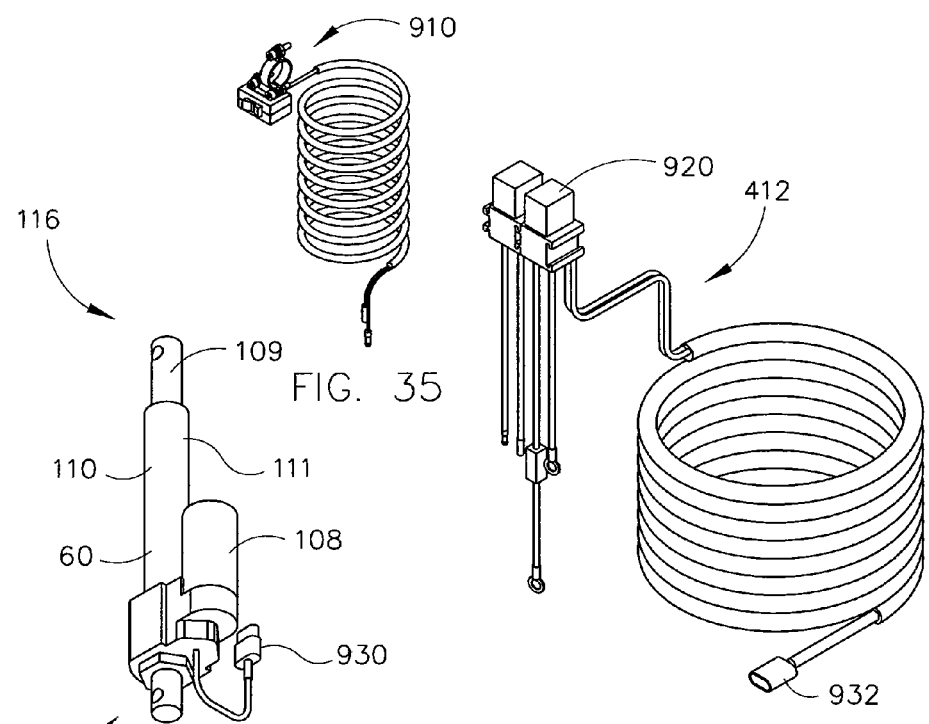
FIG. 35
FIG. 34
FIG. 36

ACCESSORY MOUNTING SYSTEMS FOR NON-HIGHWAY VEHICLES

CROSS REFERENCE TO RELATED APPLICATIONS

This application claims priority to U.S. Provisional Patent Application Ser. No. 61/141,087 filed on Dec. 29, 2008 titled "Plow System For Use With Zero-Turn Lawnmowers" and U.S. Provisional Patent Application Ser. No. 61/157,038 filed on Mar. 3, 2009 titled "Accessory Mounting System For Zero-Turn Lawnmowers", the disclosures of both of which are incorporated herein.

BACKGROUND OF THE INVENTION

1. Field of the Invention

The present invention relates generally to the field of grounds care systems and implements and, more particularly, to accessory mounting system that is configured for attaching one or more of a number of implements, such as a plow, an aerator, a dethatcher, a sprayer, and/or a broadcast or drop spreader, and lift jack to a zero-turn lawnmower.

2. Discussion of the Related Art

Others as well as the present applicant provide a number of small vehicle plow systems. Many such systems are configured for use with ATV's and/or other non-highway type vehicles that are frequently constructed for versatility, utility, and recreation. That is, where some users frequently use such non-highway type vehicles for recreational non-highway transportation, other users utilize such equipment for more utilitarian purposes. Hunters, ranchers, farmers, and tradesman frequently have one or more such vehicles to facilitate transportation across non-paved and relatively rugged landscapes and/or for surface treatment of such areas. Such equipment can commonly be equipped with plowing attachments to remove debris, e.g., snow from areas where other traditional highway-type plow-equipped vehicles cannot otherwise travel due to terrain or weight restrictions.

For instance, many highway vehicles, such as two or four wheel vehicles such as pickup trucks, dump trucks, Jeeps, or the like are commonly fitted with raisable plow systems. However, the weight, vertical height, and horizontal width of such equipment limits their use to generally paved or well traveled paths such as roadways and driveways. Furthermore, the limited maneuverability of such devices and the vehicles that support them limit the ability of such systems to adequately clear narrower paved areas, such as sidewalks, and detracts from the ability of such devices to adequately clear areas that are bounded by structures and/or areas populated by freestanding structures such as light poles, mailboxes, and/or other smaller but non-movable structures. Even experienced operators have difficulty adequately clearing areas that contain such obstructions. Maneuvering such equipment around such obstructions also increases the time required to adequately clear a desired area.

Such machines suffer from the additional drawback of their weight. Although larger equipment such as dedicated loaders, compact tractors equipped with loaders and/or blowers, and/or dozers can be used to quickly clear open areas, such equipment can be arduous to maneuver in confined spaces. Furthermore, although such devices are commonly configured for operation over dry, unpaved surfaces, use of such equipment for snow removal tends to undesirably damage underlying grades and finish surfaces if used for snow removal or ground treatment over such surfaces. For instance, such equipment is often so robust that many lawns cannot withstand the rigors associated with the operation of such devices over such areas. Plowing even paved surfaces with such devices commonly results in undesired damage to the grass surfaces adjacent such surfaces. In addition to ruts created by the wheels or tracks of such machines, the cutting edge of the plow also has a tendency to undesirably remove grass and/or sod from the areas adjacent the area being cleared when the machine itself or the plow blade extends beyond the paved surfaces.

Although smaller non-highway utility vehicles, commonly referred to as ATV's (all terrain vehicles) or UTV's (utility terrain vehicles), have uses beyond snow clearing, such machines can be expensive and/or sized such that many persons cannot afford and/or adequately store such machines. However, many persons for whom the present invention is directed have other equipment that is commonly associated with maintaining a residence or other facility and which is substantial enough to occasionally require snow plowing services. One such machine that has become prolific in recent times is the zero-turn lawnmower. The improved maneuverability as well as the ease of operation of such machines for grass cutting operations has increased the popularity of such devices.

Commonly, such machines are lighter than UTV's and ATV's and include an engine that is mounted rearward of an operator seat. A mower deck is commonly positioned generally between forward and rearward positioned wheel assemblies. The rear wheels are generally independently driven and the forward wheels are commonly fully rotatable or provided as caster wheels. The independently driven rear wheels in combination with the fully rotatable forward wheels provide a configuration wherein the mower is generally fully rotatable about a vertical center axis of the machine thereby connoting the zero-turn radius of the machine. Such machines have proven to be highly desirable for their mobility and reduced cut times.

Such machines also often include a relatively open front area. Although the open front area of the machine is highly desirable for grass cutting operations as such a configuration does not undesirably affect the operators field of view, the open front area of such machines limits the ability of the machine to support forward operating accessories. As such, such zero turn lawnmowers are generally underutilized for activities other than lawn maintenance.

Although others have provided snow removal systems for use with such "off road" machines, several undesirable attributes of such known systems has resulted in the general public's non-acceptance of such systems. One such system requires manual manipulation of a lift handle to effectuate raising and/or lowering of the plow. Understandably, not many operators have the physical strength to operate such systems. Additionally, as operation of the drive system of many zero turn lawnmowers requires both of the operators' hands, altering the elevation of the plow during movement of the mower is extremely difficult if at all possible.

Although it would be desirable to provide a powered system to effectuate movement of the plow, the generally open construction of the front area of many zero turn lawnmowers complicates the integration of such systems with the lawnmower. One such system provides a winch that is secured to a post that extends upward from the front of the machine. Although such a system reduces the effort that must be provided by the operator, such a system substantially impairs the operator's vision and reduces operator access to the operator area of the lawnmower. Furthermore, such a system includes a relatively complex mounting arrangement that must be repeatedly manipulated each time the plow system is attached and/or removed from the lawnmower.

Such winch lift assist systems suffer from an additional drawback that adversely affects the ability to maintain an elevation of the forward mounted implement. Particularly with respect to snow plowing operations, although the winch is adequate to lift the plow, plow down pressure is generated solely by the weight of the plow. Understandably, as such plows are commonly manually moved when not in use, adding weight to the plow would detract from many users preference for such versatile plow systems. Additionally, due to the limited down pressure provided by such plow systems, when the plow hits an obstruction or encounters compacted snow, such systems tend to ride up and over such obstructions. Such undesired lifting of the plow results in a less than desired clearing operation and increases the potential of the machine becoming stuck on uncleared snow. These drawbacks are further discussed in Applicant's copending United States patent applications having U.S. Ser. No. 11/513,879 filed on Aug. 31, 2006 and U.S. Ser. No. 11/843,321 filed on Aug. 22, 2007. The disclosures of both of which are incorporated herein.

Those skilled in the art also readily appreciate the variety of tools commonly associated with maintaining a landscape. Commonly, many homeowners periodically rent or own lawn care tools or implements such as mowers, aerators, dethatchers, rototillers or cultivators, spot or sweep sprayers, broadcast spreaders, etc. In addition to such lawn care implements, many homeowners, tired of the effort associated with shoveling snow, own snow blowers or plow equipment to assist with the physical effort of clearing walks and drives. Aware of the specialty of equipment and knowledge associated with such service, many people have their lawn and snow care needs serviced by others.

Regardless of who performs the service, the variety of equipment associated with lawn and yard care can tend to be expensive. For example, each implement mentioned above is commonly provided in a self supported manner. That is, each piece of equipment is intended to be operated independent of, or pulled behind, other equipment. Such a configuration increases the cost associated with each individual device. Further, maintaining each individual device can be costly as well. Furthermore, such devices commonly occupy an inordinate amount of space within any give homeowner's garage or shed. Therefore, there is a need to provide a system for providing one or more of a number of ground care implements in a comparatively compact form factor.

Another consideration of the design of such implements is the physical exertion that is commonly associated with the operation of such devices. Commonly, in the spring of the year, a lawn is aerated, dethatched, fertilizer, and partially seeded, to maintain a desired lawn surface. Manually performing such operations requires the homeowner or service provider to traverse the area to be seeded a number of times with the various different implements. Each of the implements above requires a certain degree of physical strength to attain the desired operation of the respective implement. As is readily appreciated, treating only a relatively small area in such a manner can be physically exhausting. Accordingly, there is a further need to reduce the level of exertion associated with the operation of such implements.

It is further appreciated that such devices must be moved in a manner in which the operative tools are occasionally not in contact with a ground surface. For instance, it is readily understood that pushing a dethatcher or aerator across a decorative concrete or paver surface would detrimentally affect the aesthetic appearance of such a surface and could possible damage the implement. Similarly, when not seeding and/or fertilizing, it is often required to disengage the delivery system of the spreader so as to not waste the material being spread by distribution in undesired locations. Commonly, non-operating transport of the respective implement is effectuated by awkward positioning of a handle and/or fully lifting the implement from the ground surface. Such requirements can further detract from the operability of each of the respective implements and increase the level of physical exertion associated with the use of a given implement. Therefore, there is also a need for an implement system wherein the individual implements can be transported in a less physically demanding manner.

Another consideration to the operation of such implements is the terrain that is intended to be treated. Although commonly operated along generally open and level or slightly sloping terrain, other areas can result in undesired or even unusable positioning of the implement. For instance, ditch areas commonly have two substantially pitched areas that converge toward a lowermost portion of the ditch. Treatment of such sloping or uneven areas with the implement commonly requires either operation of the underlying machine at a substantial incline relative to a gravitation vertical axis and/or repeated trips in an "up" and "down" direction through the ditch. Such operation creates the potential for equipment rollover, detracts from the traction performance of the machine, and/or is generally inefficient as doing so requires extensive reorientation of the machine relative to the work area. Therefore, there is also a need to allow terrain specific adjustment of the orientation of the implement relative to the surface over which the machine is to be operated.

Therefore, it would be desirable to provide an implement mounting system for use with "light-weight" non-highway type vehicles, such as zero-turn lawnmowers, that does not overly obstruct access to, and the view from, an operator area, that can be configured to cooperate with a number of constructions of underlying implement supporting machines, which is easy to operate, can cooperate with one or more of a number of ground treatment implements, can selectively position an implement relative to a ground or operating surface, and can selectively position an implement relative to the implement supporting machine.

SUMMARY OF THE INVENTION

The present invention is directed to an accessory mounting system for use with non-highway vehicles, such as zero-turn lawnmowers, that overcomes the aforementioned drawbacks. One aspect of the invention discloses a height adjustable multiple implement mounting system for use with off-road vehicles such as zero-turn lawnmowers. A mount assembly is secured at a forward portion of the vehicle. A push tube assembly or space frame extends from the mount assembly and supports one or more ground care implements at a location forward of the vehicle. An electric actuator has a first end that is pivotably connected to the mount assembly and a second end that is attached to the space frame. Operation of the actuator alters the elevation of the implement such that the implement can be moved between in-use and out-of-use positions relative to a ground surface. In a preferred aspect, the mount assembly allows lateral or side-to-side rotation of the space frame and actuator so that the implement can be laterally inclined or pitched with respect to the vehicle.

Another aspect of the invention that can be used in combination with one or more of the above aspects discloses a zero-turn lawnmower accessory mount system that includes a space frame that pivotably cooperates with a structure secured to a frame of the zero-turn lawnmower so that the space frame extends forward from the zero-turn lawnmower and can be raised and lowered relative thereto. A ground treatment implement is supported by the space frame. The system includes an electric actuator having a first end that is positionally fixed with respect to the structure secured to the frame and a second end that is attached to the space frame such that operation of the actuator alters a position of the space frame relative to a ground surface.

Another aspect of the invention that is useable with one or more of the above aspects discloses a kit for mounting one or more ground treatment implements to a zero-turn mower. The kit includes a pivot plate assembly having a first member adapted to be secured and positionally fixed with respect to a forward portion of a frame of a zero-turn mower and a second member that is pivotally connected to the first member. A space frame includes a first end that toollessly, or without the aid of tools, and pivotally engages the second member of the pivot plate assembly such that the second member is disposed between the first member and the space frame and a second end that is adapted to support an implement. The system includes an electronic actuator that is adapted to be powered by a power system of the zero-turn mower. A first end the electronic actuator is toollessly connectable to the second member of the pivot plate assembly and a second end of the electronic actuator is connectable to the space frame at a location offset in a forward direction from the pivot plate assembly. Operation of the electronic actuator manipulates the orientation of the space frame relative to the pivot plate assembly.

Another aspect of the invention that is usable with one or more of the above aspects includes an off-road vehicle implement mounting system that includes a clamp assembly adapted to mount to a front portion of a frame of a vehicle. The clamp assembly includes a pivot mount assembly having a first portion that is positionally fixed with respect to the vehicle and a second portion that is pivotable with respect to the frame of the vehicle about an axis that is generally aligned with a longitudinal axis of the vehicle. The mounting system includes a space frame having a first end that is pivotally connected to the pivot mount assembly so that the space frame pivots about an axis that is oriented in a crossing direction with respect to the longitudinal axis of the vehicle. A ground treatment implement is attached to the space frame at a location forward of the first end of the space frame with respect to the vehicle. The system includes an electric actuator having a first end that is attached to the second portion of the clamp assembly and a second end that is attached to the space frame and operable to selectively raise and lower the ground treatment implement with respect to the vehicle and independent of an orientation of the second portion of the pivot mount assembly relative to the vehicle.

Another aspect of the invention that is useable with one or more of the above aspects discloses a method for providing a pivotable quick connect accessory mounting system for residential vehicles. The method includes providing a toollessly severable connection with a mount assembly positioned between a frame of a vehicle and an implement. A first portion of the mount assembly is attached to the vehicle and a second portion of the mount assembly is attached to the implement. An implement is provided that is supported by the second portion of the mount assembly such that the second portion of the mount assembly is pivotable relative to the first portion so as to change an elevation of the implement relative to the frame when the first portion and the second portion of the assembly are connected to one another and the frame. A first end of a variable length electronic actuator is connectable to the first portion of the mount assembly and a second end of the variable length electronic actuator is connectable to the second portion of the mount assembly such that changes in length of the actuator changes elevation of the implement relative to the vehicle.

Another aspect of the invention that is useable with one or more of the above aspects discloses a zero-turn lawnmower accessory system having a clamp assembly that is pivotably secured to a front portion of a frame of a zero-turn lawnmower. A space frame assembly is pivotably supported by the clamp assembly and extends in a forward direction relative thereto. A ground care implement is supported by the space frame. The system includes an electric ram having a first end attached to the clamp assembly and a second end attached to the space frame such that operation of the electric ram changes an elevation of the ground care implement relative to the frame of the zero-turn lawnmower.

Another aspect of the invention that is usable with one or more of the above aspects includes providing the implement as one or more of a plow, an aerator, a dethatcher, a sprayer, a drop spreader, a broadcast spreader, and a rototiller. Preferably, each system is configured to concurrently support more than one implement. More preferably, when more than one implement is concurrently supported, the system is configured to allow selective operation of only one implement.

In another preferred aspect, the electrical actuator is provided as an electromechanical screw mechanism. More preferably, the electrical actuator is powered by the underlying implement supporting device. Preferably, the electrical actuator includes a control that is positioned proximate the operator area of the underlying implement supporting device.

In another preferred aspect that is usable with one or more of the aspects described above, the implement supporting system includes a toollessly several connection wherein a portion of the system remains attached to the underlying vehicle and another portion of the system remains attached to the implement. More preferably, a latch assembly is provided that includes more than one latch wherein each latch is biased to a closed position and each latch is operable by a single handle.

In another preferred aspect, the horizontal pivotable connection between the implement and the vehicle is configured to allow the implement to be rotated between about 30 degrees and 360 degrees with respect to the underlying vehicle. More preferably, the horizontal rotation of the pivotable connection is unencumbered.

In another preferred aspect, the pivotable portion of the clamp assembly includes a fixed disk assembly having a center disk that is captured by a rotatable portion of the clamp assembly and a pair of disks that flank the center disk. More preferably, a pair of bearing disks is positioned between the center disk and each of the flanking disks. In an alternative aspect, the clamp assembly removably cooperates with a receiver, such as a 2 inch receiver, that is permanently fixed to a forward portion of the underlying vehicle.

These and other aspects and advantages of the present invention will be better appreciated and understood when considered in conjunction with the following description and the accompanying drawings. It should be understood, however, that the following description, while indicating preferred embodiments of the present invention, is given by way of illustration and not of limitation. Changes and modifications may be made within the scope of the present invention without departing from the spirit thereof. The present invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 2 is a side elevation view of the lawnmower shown in FIG. 1 with the plow blade oriented in a down position;

FIG. 3 is a view similar to FIG. 2 and shows the plow blade in a raised position;

FIG. 5A is a perspective view of the system shown in FIG. 1 with the frame of the zero-turn lawnmower shown in phantom and a space frame or pair of lateral extension arms removed therefrom;

FIG. 5B is a perspective detail view of the interface between an actuator of the mounting system and a lower implement bracket assembly;

FIG. 5C is a perspective detail view of one of the vehicle mount assemblies of the accessory mounting system;

FIG. 33 is a side elevation view of the implement mounting system shown in FIG. 14 and oriented to be aligned for engagement with a clamp assembly attached to a zero-turn lawnmower;

FIG. 34 is a perspective view of an electronic actuator of the implement mounting systems shown in FIGS. 1, 8, and 14;

FIG. 35 is a perspective view of a switch assembly of the implement mounting systems shown in FIGS. 1, 8, and 14 for controlling operation of the actuator shown in FIG. 32;

FIG. 36 is a perspective view of an exemplary wiring harness of the implement mounting systems shown in FIGS. 1, 8, and 14 for communicating switched power between the underlying vehicle and the actuator shown in FIG. 34.

Figure 1:
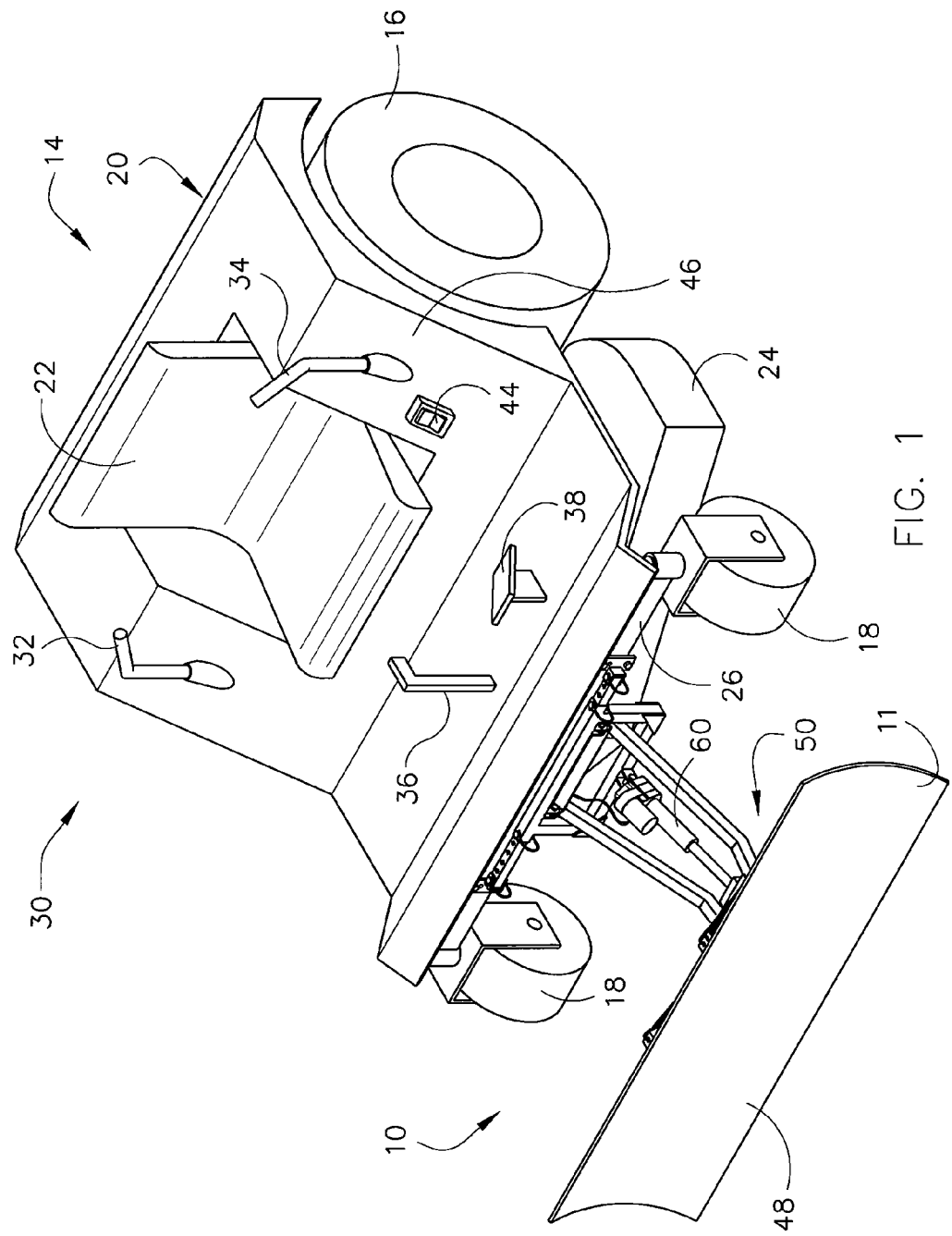
FIG. 1 is a perspective view of an implement or accessory mounting system according to one embodiment of the invention and attached to a zero-turn lawnmower and having a plow attached thereto.

In describing the various preferred embodiments of the invention which are illustrated in the drawings, specific terminology is resorted to for the sake of clarity. However, it is not intended that the invention be limited to the specific terms so selected and it is to be understood that each specific term includes all technical equivalents which operate in a similar manner to accomplish a similar purpose. For example, the words connected, secured, attached, or terms similar thereto are often used. They are not limited to direct connection unless otherwise specified but include connection through other elements where such connection is recognized as being equivalent by those skilled in the art.

DESCRIPTION OF PREFERRED EMBODIMENT

FIGS. 1-7 show an implement or accessory mounting system or simply a mount system 10 according to one embodiment of the present invention. As shown in FIGS. 1-3, in one aspect of the invention, an implement 11 is attached to a forward facing end 50 of mount system 10. As described further below, although implement 11 is shown as what is commonly understood as a blade, or snow plow blade, it is envisioned that implement 11 can be provided in any of a number of forms such as a lift jack, dethatcher, an aerator, spreaders, sprayers, a cultivator or rototiller, or any of a number of ground treatment devices.

As shown by way of example in FIGS. 1-3, implement 11 is provided as a plow blade or blade 48 that is pivotably connected to a self powered device or a "lightweight" non-highway machine or vehicle such as a zero-turn zero-turn lawnmower 14. As used herein, non-highway lightweight machines can include lawnmowers, ATV's, UTV's, and the like. Machines like zero-turn lawnmower 14 are generally of a class of machine that is configured to be ridden by an operator and is lighter than most if not all highway driven vehicles and/or operator ridden equipment associated with material moving tasks such as tractors, earthmovers, compact tractors, backhoes, and the like.

Still referring to FIG. 1, as is commonly understood of such mowers, zero-turn lawnmower 14 includes a pair of rear drive wheels 16 and a pair of non-driven front or forward wheels 18. Understandably, different wheel arrangements from multiple manufacturers are common. That is other arrangements of zero-turn lawnmower 14 include drive wheels that may be positioned at the front of the mower and the non driven caster turn wheels at the rear. This arrangement still enables the mowers "zero turn" capability but rearranges the drive wheels configuration with the caster steer wheels to enable better traction with different weight and slope configurations. Referring back to the arrangement shown in FIG. 1, an engine 20 is generally positioned behind an operator seat 22 and is configured to power drive wheels 16. A deck or cutting deck 24 is commonly suspended from zero-turn lawnmower 14 and is generally positioned between drive wheels 16 and non-driven forward wheels 18. Deck 24 is connected to be movable in an up and down direction relative to a frame 26 of zero-turn lawnmower 14.

Operator seat 22 is generally centrally positioned within an operator area 30 of zero-turn lawnmower 14. A pair of control levers 32, 34 generally flank seat 22 and are configured to control operation of the respective drive wheels 16. One or more foot pedals 36, 38 control brake operation and/or the elevation of cutting deck 24 relative to frame 26. Understandably, the heretofore description of zero-turn lawnmower 14 is merely exemplary of what is commonly understood as a zero-turn lawnmower. It is appreciated, and intended, that the present invention be usable with zero-turn lawnmowers having constructions and control configurations other than those shown.

A control 44 is positioned proximate operator area 30 and is configured to control operation of an actuator 60 of mount system 10 as is described further below. Although control 44 is shown as mounted on a panel 46 of zero-turn lawnmower 14, it is envisioned that control 44 could be positioned on one of control levers 32, 34 so as to allow concurrent operation of actuator 60 and a respective control lever 32, 34.

Referring to FIGS. 1-3, an implement 11 such as a plow or plow blade 48 is attached to a forward facing end 50 of mount system 10 and an opposite end of mount system 10 is secured to frame 26 of zero-turn lawnmower 14. When attached to zero-turn lawnmower 14, operation of actuator 60 moves implement 11 between an in-use or down position 52 (as shown in FIG. 2) and a stored, transport, or up position 54 (as shown in FIG. 3). When oriented in down position 52, implement 11 is maintained at a desired elevation with respect to a ground surface 53 and mount system 10 is positioned nearly entirely below frame 26 of zero-turn lawnmower 14 so as to not overly interfere with an operator's field of vision. Such a configuration also enhances the user's access to operator area 30 even when mount system 10 and implement 11 are attached to zero-turn lawnmower 14. It is further appreciated that one end of actuator 60 could be secured at a location above frame 26. Although such an orientation may present a slight increase in the forward facing footprint of zero-turn lawnmower 14, such an orientation would increase the attack angle associated with actuator 60 providing down pressure to plow blade 48.

Referring to FIGS. 4A-6, mount system 10 includes a clamping system or clamp assembly 55 that includes a rearward positioned frame bracket assembly 56 and a space frame assembly 57 that extends forward from clamp assembly 55. As used herein, clamp assembly 55 includes the structure that is secured to the underlying vehicle and which can remain attached thereto when it is desired to disengage the implement from the vehicle. Space frame assembly 57 generally includes the portion of mount system 10 that remains engaged with an implement and can be selectively engaged with clamp assembly 55.

A plow bracket assembly 58 is secured proximate a forward facing end of space frame assembly 57. Space frame assembly 57 includes a pair of laterally spaced arms or pivot arms 62, 64 that extend between frame bracket assembly 56 and plow bracket assembly 58. An actuator 60 extends in a generally longitudinal direction 59 (FIG. 4) with respect to a longitudinal axis of zero-turn lawnmower 14. Such a constructions generally aligns actuator 60 with pivot arms 62, 64 and so that the actuator 60 is generally flanked on opposite lateral sides by arms 62, 64. Preferably, each pivot arms 62, 64 is attached to frame bracket assembly 56 of clamp assembly 55 at a higher elevational position than actuator 60 is attached to clamp assembly 55.

Frame bracket assembly 56 includes a plow mount frame 66, a pair of extension arms 68, 70, and a pair of vehicle mounts 72, 74. As shown best in FIGS. 5A and 5C, each vehicle mount 72, 74 includes a pair of plates 76, 78 that are constructed to be secured about a portion of frame 26 of zero-turn lawnmower 14. A number of holes 79 are formed in each of plates 76, 78 such that the vehicle mounts 72, 74 can be configured for cooperation with uniquely configured or shaped portions of frame 26.

Each forward plate 76 includes a mount flange 80 that is constructed to cooperate with an end 82 of a respective extension arm 70 of mount system 10. A clevis pin, fastener, or pin 84 cooperates with each mount flange 80 and a corresponding hole formed in a respected extension arm 70. Pins 84 cooperate with each respective extension arm 70 such that mount system 10 can be removed from zero-turn lawnmower 14 in a tool-less manner. Each extension arm 70 cooperates with an opposite end of an upper tube 86 of plow mount frame 66. A clevis pin, fastener, or pin 88 cooperates with aligned holes formed in upper tube 86 of plow mount frame 66 and one of respective extension arms 70 such that the extension arms 70 cooperate with the plow mount frame 66 in a telescopic manner. Such a construction allows users to tailor clamp assembly 55 to cooperate with any of a number of underlying zero-turn lawnmower constructions and allows for convenient lateral or side-to-side positioning, as indicated by arrow 61 (FIG. 4A) of space frame assembly 57 relative to zero-turn lawnmower 14.

Figure 4A:
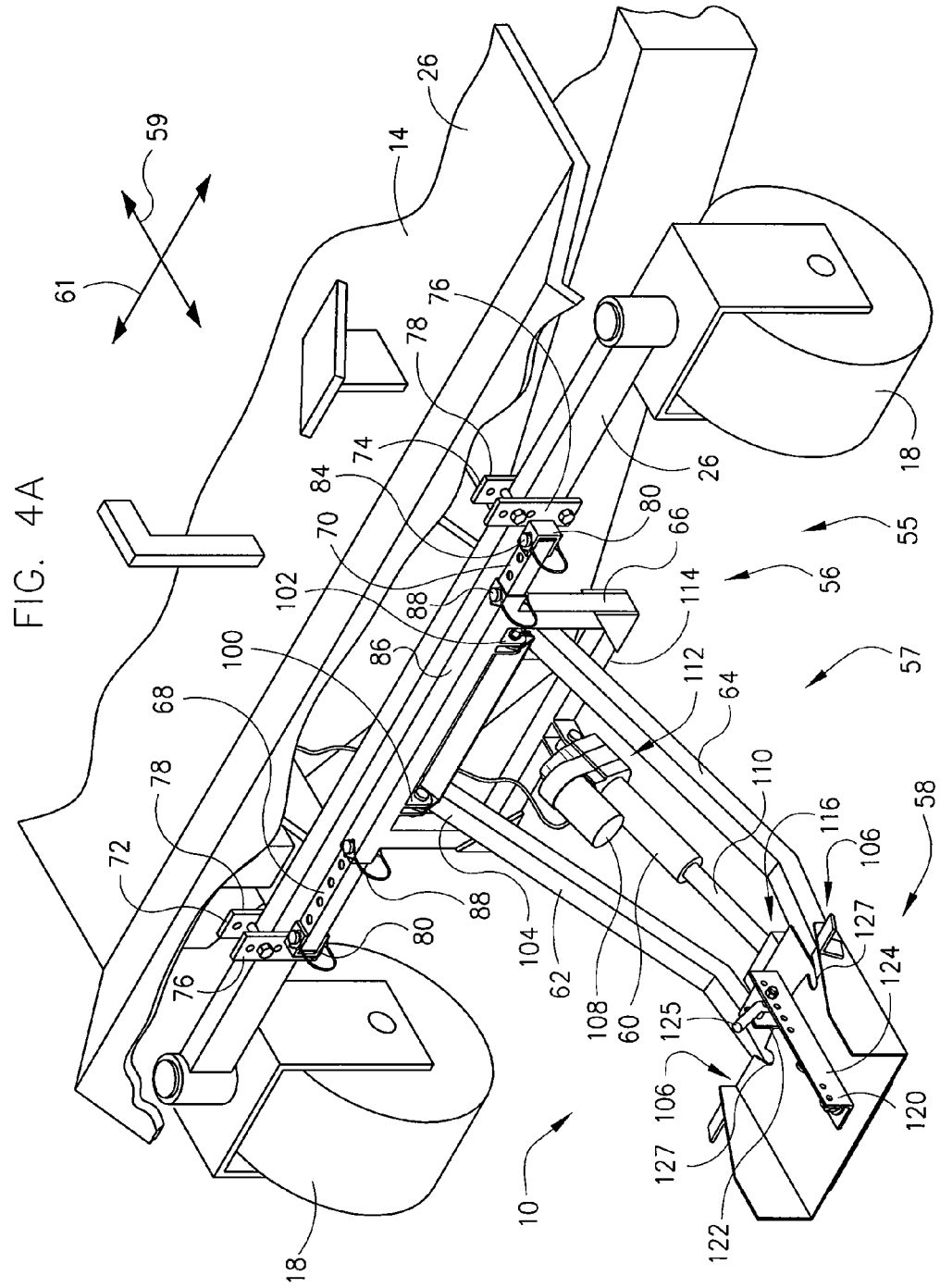
FIG. 4A a perspective view of the plowing system shown in FIG. 1 with the plow blade removed therefrom.
Figure 4B:
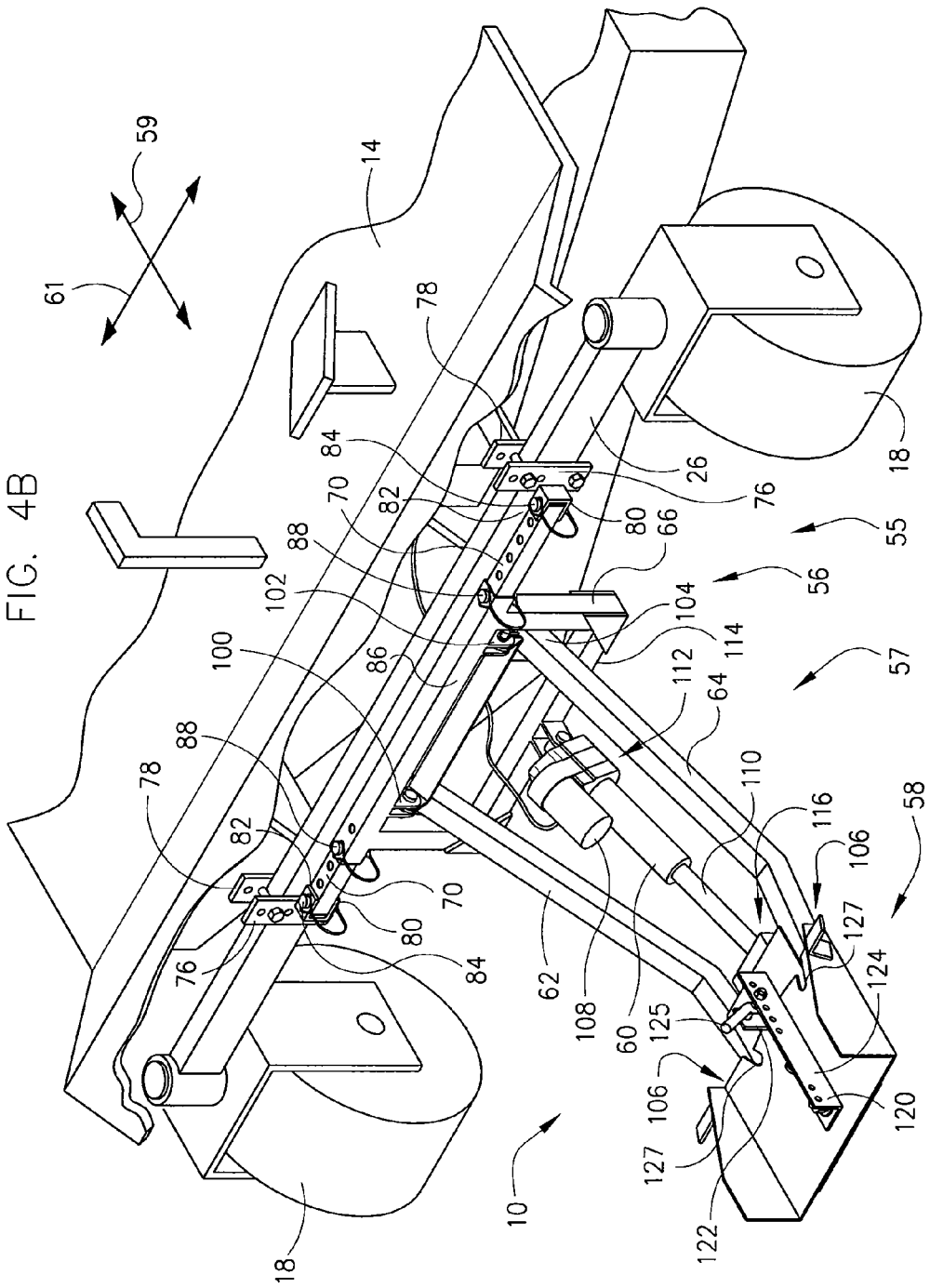
FIG. 4B is a view similar to FIG. 4A and shows another orientation for securing the plowing system to a zero-turn lawnmower.
Figure 6:
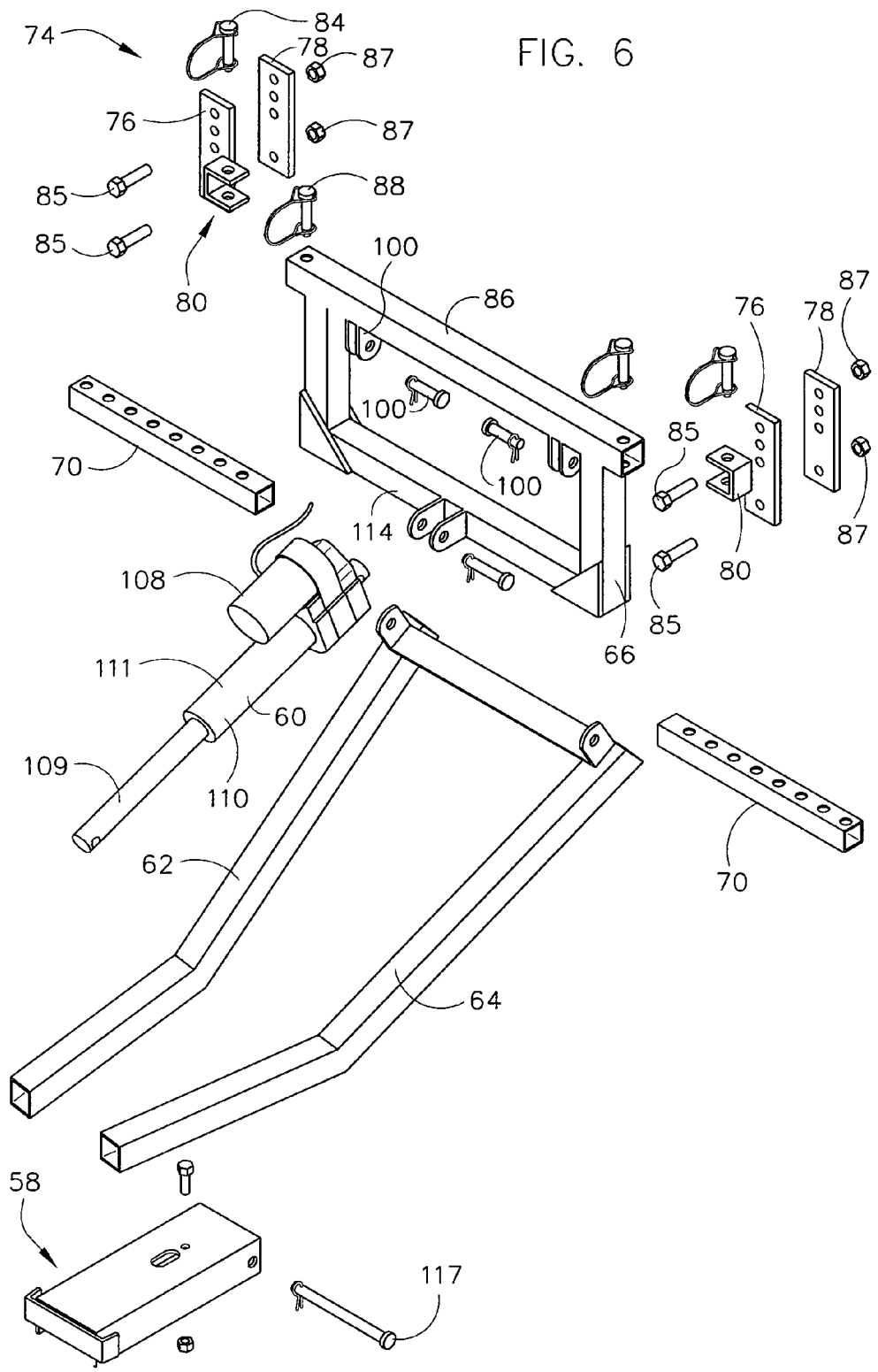
FIG. 6 is an exploded view of the mounting system shown in FIG. 1.

As shown in FIGS. 4A and 4B, mount system 10 can be configured to cooperate with a variety of lawnmower constructions. It should be appreciated from a comparison of the assemblies shown in FIGS. 4A and 4B that each of vehicle mounts 72, 74 is independently securable about frame 26 of zero-turn lawnmower 14 relative to non-driven wheels 18. FIGS. 4A and 4B further evidence the variable positioning of plow mount frame 66 relative to extension arms 70. Such versatility allows mount system 10 to be secured to a variety of zero-turn lawnmower constructions and allows a user to position mount system 10 at a desired lateral position, as indicated by arrow 61, relative to zero-turn lawnmower 14.

Understandably, although a generally centered orientation would most likely be most common, clamp assembly 55 also facilitates offsetting of mount system 10 to the left and/or right of center for those users who prefer such a configuration.

Still referring to FIGS. 4A and 4B, clamp assembly 55 includes a pair of pivot arm mounts 100, 102 that each extend in a downward direction from upper tube 86 of mount frame 66. A first end 104 of each pivot arm 62, 64 is pivotally secured to a respective pivot arm mount 100, 102. A forward facing end 106 of each pivot arm 62, 64 is attached to plow bracket assembly 58. During operation of actuator 60, pivot arms 62, 64 rotate relative to mount frame 66 and support plow bracket assembly 58 in response to operation of actuator 60. The lateral offset or spaced orientation of pivot arms 62, 64 enhances the lateral stiffness of mount system 10 during plowing operations and helps mount system 10 withstand uneven lateral loading of implement 11 such as plow blade 48.

As shown in FIGS. 4B and 34, actuator 60 includes a motor 108 and a ram 110. As is commonly understood, operation of motor 108 alters the length of ram 110 by extending a shaft 109 from a tube 111. A rearward facing end 112 of actuator 60 is pivotally secured to a lower tube 114 of plow mount frame 66. As shown in FIGS. 4A-5B, a forward facing end 116 of actuator 60 is pivotally secured to plow bracket assembly 58. A fastener or pin 117 secures actuator 60 to plow bracket assembly 58 such that bracket assembly 58 can pivot during movement of actuator 60. Lengthening of ram 110, by extending shaft 109 relative to tube 111, translates plow bracket assembly 58 in an upward direction whereas shortening of ram 110, by retracting shaft 109 relative to tube 111, translates plow bracket assembly 58 in a downward direction. Generally, the length of actuator 60 defines the position of plow bracket assembly 58 (and thereby implement 11 or plow blade 48) relative to frame 26 of zero-turn lawnmower 14 and ground surface 53 or the terrain being traversed. It can be readily understood that the generally orthogonal orientation mount system 10 relative to zero-turn lawnmower 14 maintains implement 11 in an orientation that is generally horizontally aligned with the horizontal orientation of frame 26 of zero-turn lawnmower 14.

Figure 7:
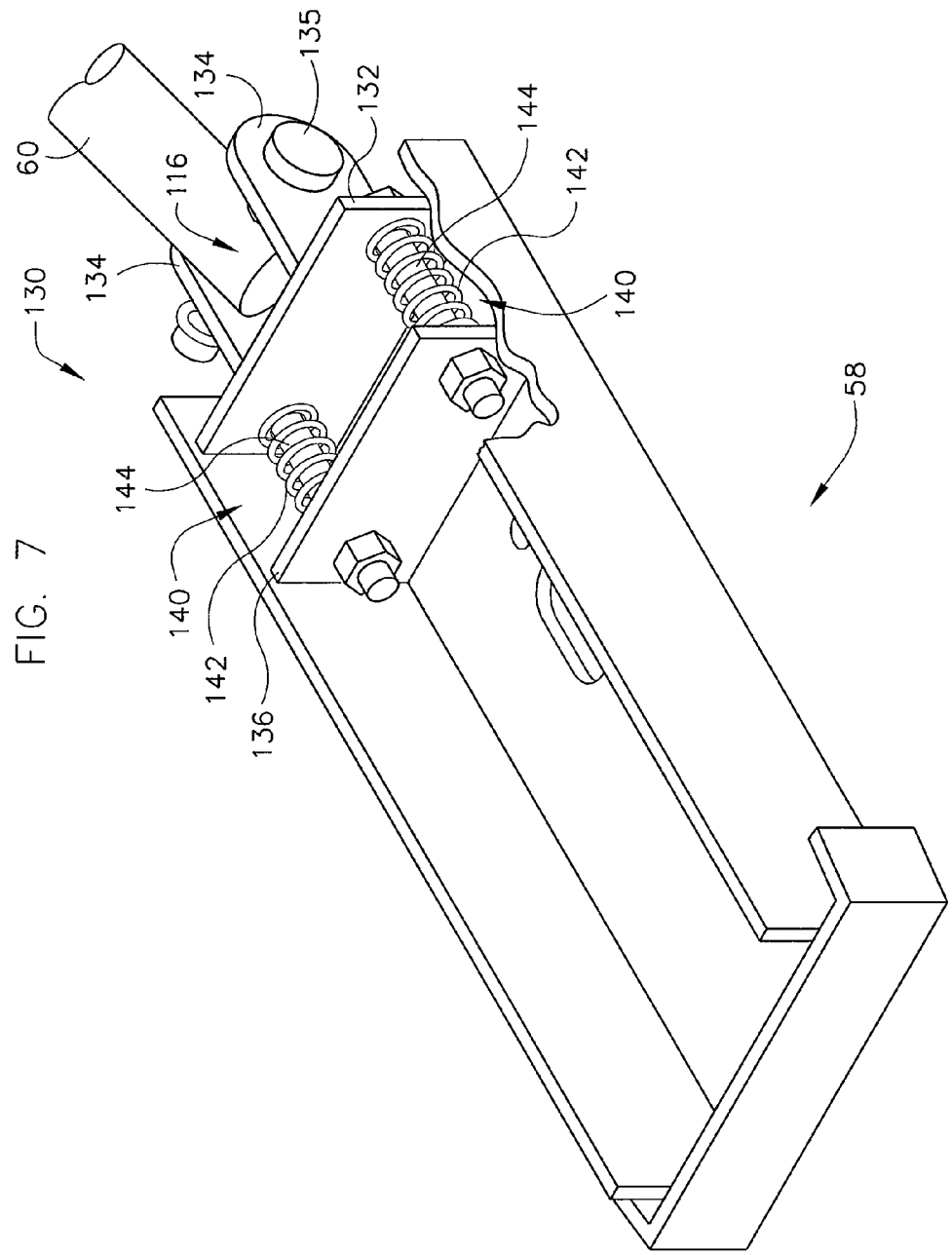
FIG. 7 is a perspective view of an optional shock arrestor assembly that can be disposed between one end of the actuator and the adjacent structure of the mounting system.

FIG. 7 shows an optional absorber or shock assembly 130 usable with the present invention. Rather than securing shaft 109 of ram 110 of actuator 60 directly to plow bracket assembly 58 with a pin 117 as shown in FIG. 5B, optional shock assembly 130 is disposed between actuator 60 and plow bracket assembly 58. A mount plate 132 includes a pair of tabs 134 that are constructed to be secured to forward facing end 116 of actuator 60 by a pin 135 or the like. Mount plate 132 is attached to plow bracket assembly 58 such that the mount plate 132 is movable relative thereto. A cross bracket 136 is secured to plow bracket assembly 58 and cooperates with a pair of spring assemblies 140.

Each spring assembly 140 includes a spring 142 that is coaxially aligned along a shaft 144 that extends between cross bracket 136 and mount plate 132. Spring assemblies 140 are generally aligned along a longitudinal axis of mount system 10. Springs 142 bias mount plate 132 away from cross bracket 136. In the event plow blade 48 impacts a generally immovable material or object, springs 142 are compressed by mount plate 132 thereby arresting a portion of the energy associated with the impact of plow blade 48. Understandably, shock assembly 130 is optional in as much as the generally linear alignment of mount system 10 with zero-turn lawnmower 14 provides a robust connection for communicating loads imparted to plow blade 48 to frame 26 of zero-turn lawnmower 14.

Referring back to FIGS. 4A and 4B, plow bracket assembly 58 includes a rib 120 and a tab 122. A number of holes 124 are formed in rib 120 and cooperate with at least one hole formed in tab 122. An adjustable pin 125 is pivotably attached to tab 122 and extends in a downward direction so as to cooperate with a number of detents 127 associated with plow bracket assembly. Cooperation of pin 125 with one of detents 127 defines a lateral or side-to-side orientation of plow bracket assembly 58 with respect to space frame assembly 57. Pin 125 and detents 127 can be selectively secured in a variety of positions such that plow bracket assembly 58 is maintained at a desired orientation or lateral side-to-side pitch with respect to zero-turn lawnmower 14. Such a configuration allows side-to-side movement of material when blade 48 is engaged with mount system 10. Such a construction allows mount system 10 to maintain blade 48 in a generally vertical and horizontal orientation and with left or right side pitch relative to zero-turn lawnmower 14.

FIGS. 8-13 show an accessory mount or mounting system 200 according to another embodiment of the invention. Accessory mounting system 200 includes a space frame 210 that removably and pivotably cooperates with a clamp assembly or frame bracket assembly 202 that is adapted to be secured to a vehicle such as zero-turn lawnmower 14. Frame bracket assembly 202 is generally similar to frame bracket assembly 56 of mount system 10. Frame bracket assembly 202 includes a first mount 204 and a second mount 206 that each engage frame 26 of zero-turn lawnmower 14. First and second mounts 204, 206 are fairly adjustable in a manner similar to mount system 10 so as to cooperate with frame rails having a variety of different orientations, sizes, and shapes.

Frame bracket assembly 202 includes a center portion 208 that cooperates with each of first mount 204 and second mount 206 in a plurality of positions such that center portion 208 can be laterally positioned with respect to a longitudinal axis of zero-turn lawnmower 14. Such a configuration further enhances the flexibility of securing mounting system 200 to underlying vehicle 14.

Space frame 210 of accessory mounting system 200 preferably includes a pair of longitudinal members or arms 212, 214 that extend in a forward direction with respect to frame bracket assembly 202. A rear lateral member 216 of space frame 210 includes in actuator mount 218 that cooperates with one end of an actuator 220 so as to provide a pivotable connection therebetween. The construction and operation of actuator 220 is similar to actuator 60 as described above with respect to mount system 10 and as is shown in FIGS. 4A, 4B and 34.

A pair of optional casters 224, 226 extend in a forward direction on generally opposite lateral sides of space frame 210. The construction and operation of casters 224, 226 is similar to non-driven front wheels 18 of zero-turn lawnmower 14. Casters 224, 226 provide forward support for mounting system 200 and can be configured to provide a maximum downward or in-use orientation of accessory mounting system 200. Such a configuration prevents a user from subjecting an implement supported by mounting system 200 to down pressures that could damage or impair operation of the implement. Alternatively, it is envisioned that such a down orientation stop be associated with a fully retracted orientation of actuator 220.

Rearward ends 230 of longitudinal arms 212, 214 of space frame 210 are pivotably supported by center portion 208 of frame assembly 202. Similar to plow mount system 10, lengthening of actuator 220 rotates accessory mounting system 200 in an upward direction, indicated by arrow 236, about the rearward ends 230 of longitudinal arms 212, 214. In a similar manner, shortening of actuator 220 rotates accessory mounting system 200 in a downward direction, indicated by arrow 238, until casters 224, 226 contacts a ground surface and/or a respective implement attains a desired operating or in-use position. It is appreciated that depending on the configuration and application associated with a particular implement, manipulation of mounting system 200 moves a supported implement between in-use and stored or transit positions with respect to zero-turn lawnmower 14. Understandably, give implements, such as sprayers and/or spreaders that are not ground driven and/or do not require interaction with a ground surface for operation or use, can be configured for use at any of the positions of mounting system 200 between the raised and lowered positions.

Accessory mounting system 200 includes a number of accessory mounts 240, 242, 246 positioned at generally opposite lateral sides of accessory mounting system 200. As described further below with respect to FIGS. 9-12, accessory mounts 240, 242, 246 facilitate the attachment of one or more implements to accessory mounting system 200 and facilitate variable positioning of the respective implements between use and non-use positions with respect to mounting system 200 and in a manner that is independent of the orientation of mounting system 200 with respect to zero-turn lawnmower 14.

Figure 9:
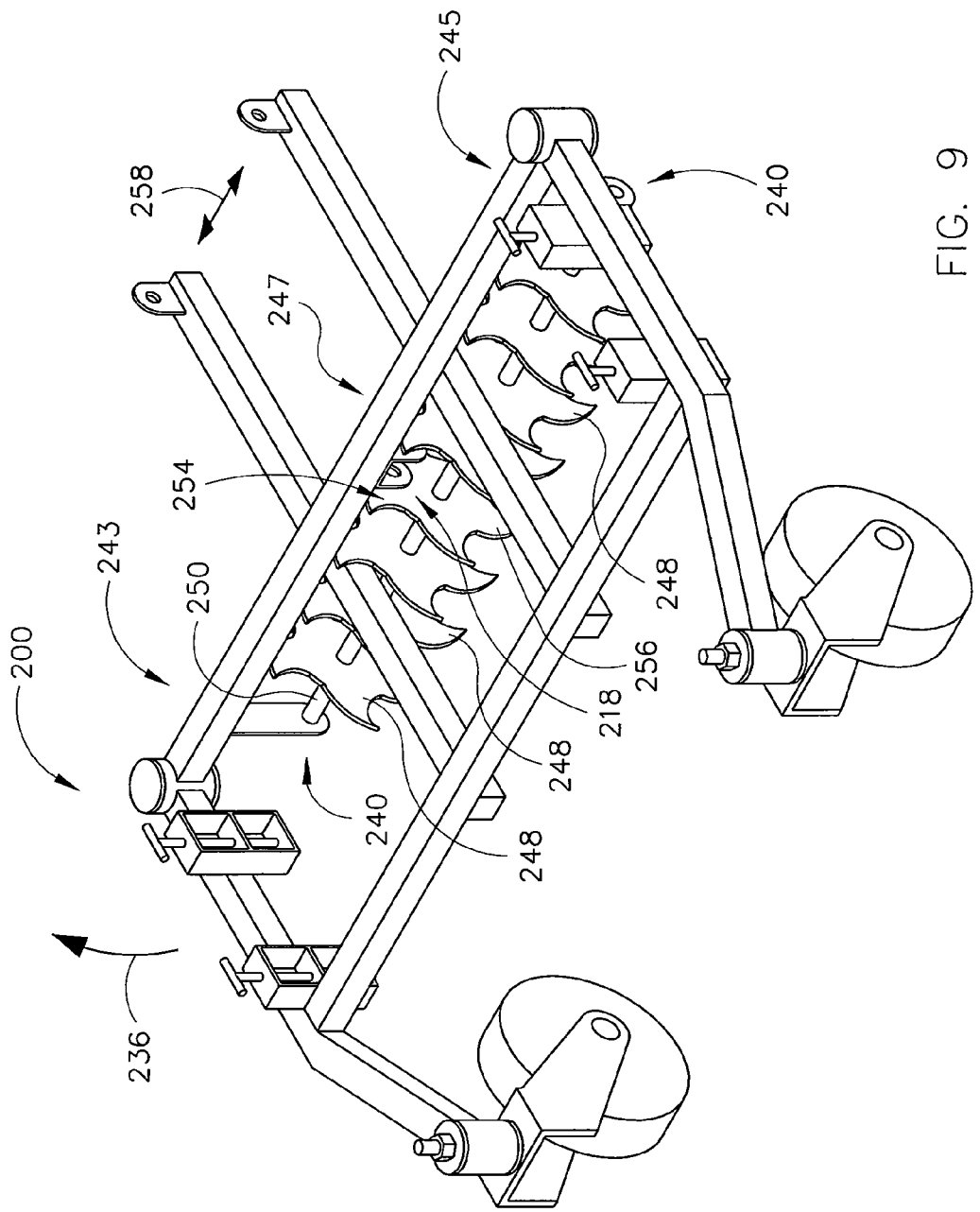
FIGS. 9-13 are views similar to FIG. 8 and show the accessory mounting system removed from the vehicle and with various ground care implements supported by the mounting system.

As shown in FIG. 9, accessory mounts 240 support generally opposite ends 243, 245 of an implement such as an aerator 247. Aerator 247 includes a number of blades 248 that are supported by a shaft 250 that is rotational engaged with a respective aerator mount 240. A space 254 is maintained between actuator mount 218 and a nearest adjacent aerator blade 256 so that aerator 247 can be translated in a lateral direction, indicated by arrow 258, such that aerator 247 can be conveniently removed and/or engaged with accessory mounting system 200. Although aerator 247 is shown as what is commonly understood as a blade or knife aerator, it is envisioned that accessory mounting system 200 could be configured to cooperate with a cultivator, cultipackers, and/or a plug or bore type aerator. Understandably, such devices may be powered by interaction with a ground surface, the power system of zero-turn lawnmower 14, and/or be provided with a dedicated power source such as an engine or battery system.

Figure 8:
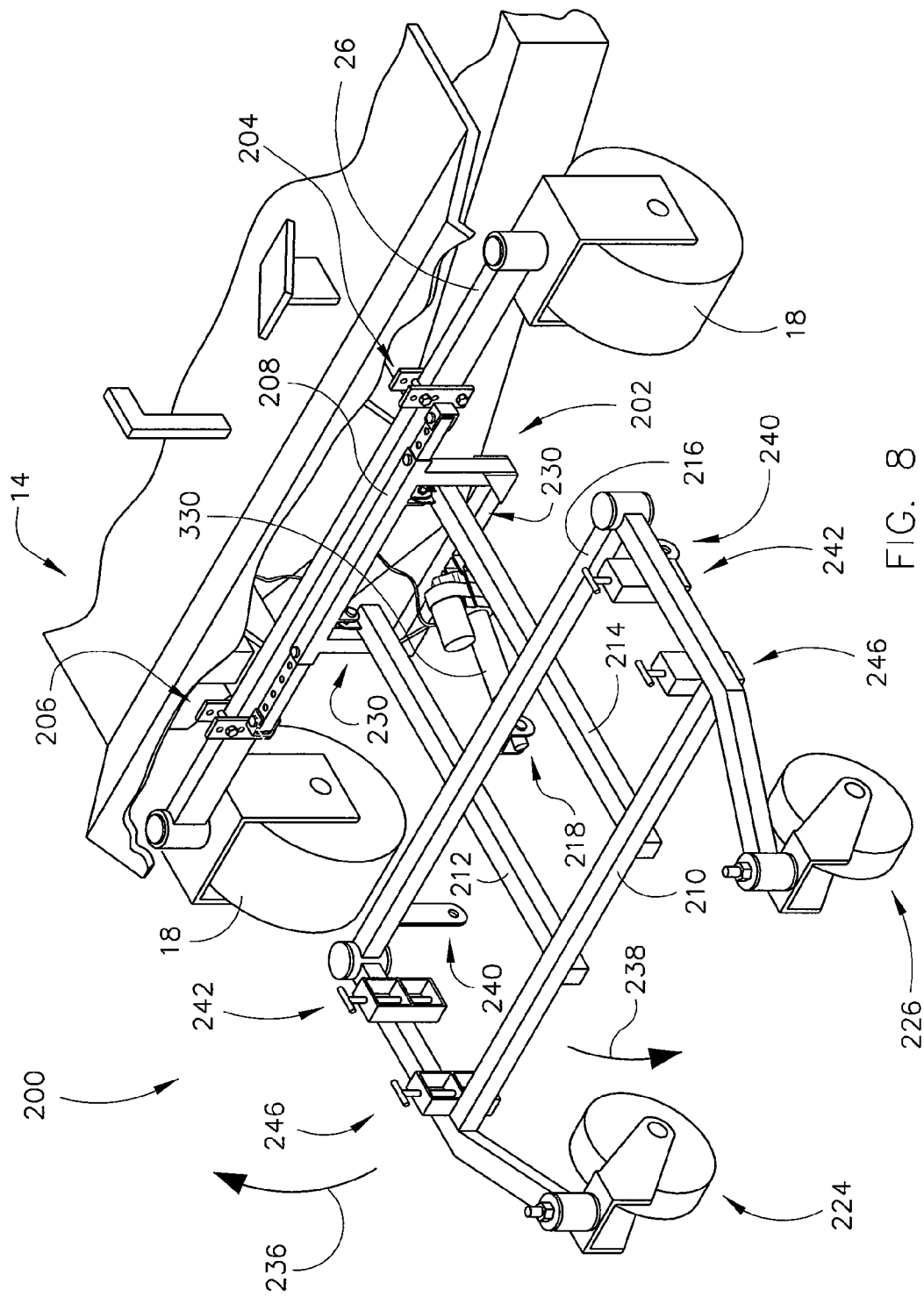
FIG. 8 is a view similar to FIG. 4A and shows an accessory mounting system according to another embodiment of the invention with the implements removed therefrom.

Referring to FIGS. 8 and 9, lengthening of actuator 220 rotates aerator 247 in upward direction 236 such that aerator 247 can be selectively engaged or disengaged from the surface of the ground being traversed by zero-turn lawnmower 14 by raising and/or lowering space frame 210 of accessory mounting system 200 with respect to clamp assembly 202 and zero-turn lawnmower 14. It is appreciated that operation of actuator 220 can provide a desired penetration depth associated with cutting or perforation operation of aerator 247 relative to zero-turn lawnmower 14.

Figure 10:
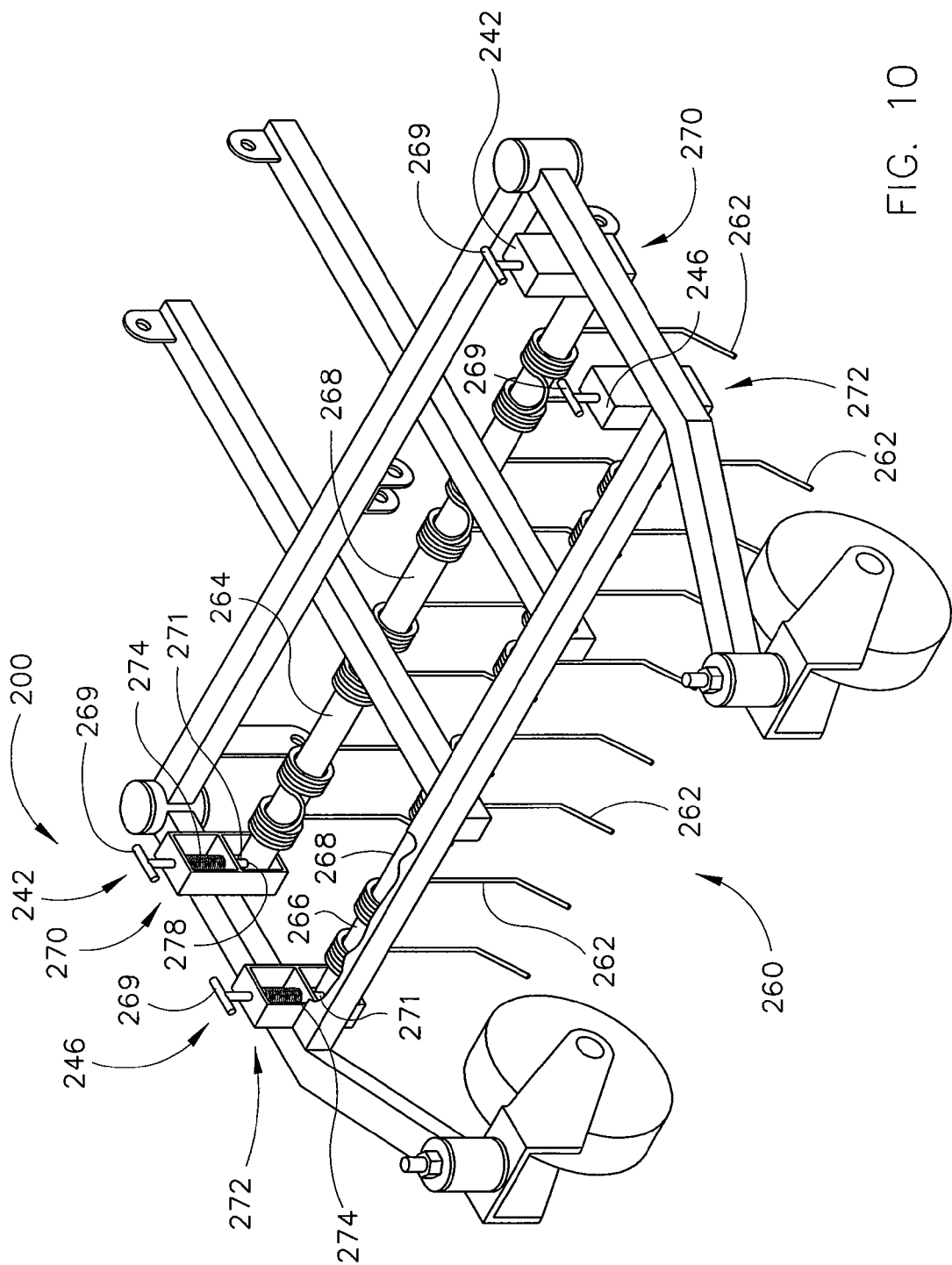

FIG. 10 shows a dethatching system 260 supported by accessory mounting system 200. Dethatching system 260 includes a number of tines 262 that engage a ground surface in a manner that untangles groundcover materials such as matted grass and/or undercover brush. The dethatching system 260 includes a first row 264 and an optional second row 266 of tines 262. Each row of tines 264, 266 is supported by a shaft 268 whose generally opposite ends 270, 272 are supported by a respective accessory mounts 242, 246.

At least one respective end of each shaft 268 cooperates with a mount 242, 246 that includes a handle 269 that is attached to a pin 271. A spring 274 is positioned about a portion of pin 271 and biases the pin into engagement with a cavity or opening 278 formed in each shaft 268. Shaft 268 includes another cavity or detent that is radially offset from opening 278. Preferably, the additional opening is positioned approximately 90° from opening 278. Cooperation of pin 271 with the opening 278 or detent allows one or more of first row 264 or second row 266 of tines 262 of dethatching system 260 to be rotated between a stored or out-of-use position and an in-use position, as shown in FIG. 10, with respect to space frame 210. Understandably, raising space frame 210 relative to zero-turn lawnmower 14 would allow tines 262 to be disengaged from the ground surface without otherwise altering the position of shafts 268 relative to space frame 210. Such a configuration allows dethatching system 260 to be raised so that zero-turn lawnmower 14 can convenient traverse those areas where interaction between tines 262 and a ground surface is undesired.

Although FIGS. 9 and 10 show aerator 247 and dethatching system 260 removed from accessory mounting system 200, it is appreciated that aerator 247 and dethatching system 260 can be concurrently supported by accessory mounting system 200. Such a construction allows dethatching system 260 and/or aerator 247 to be concurrently or individually used while both implements remain supported by accessory mounting system 200.

Figure 11:
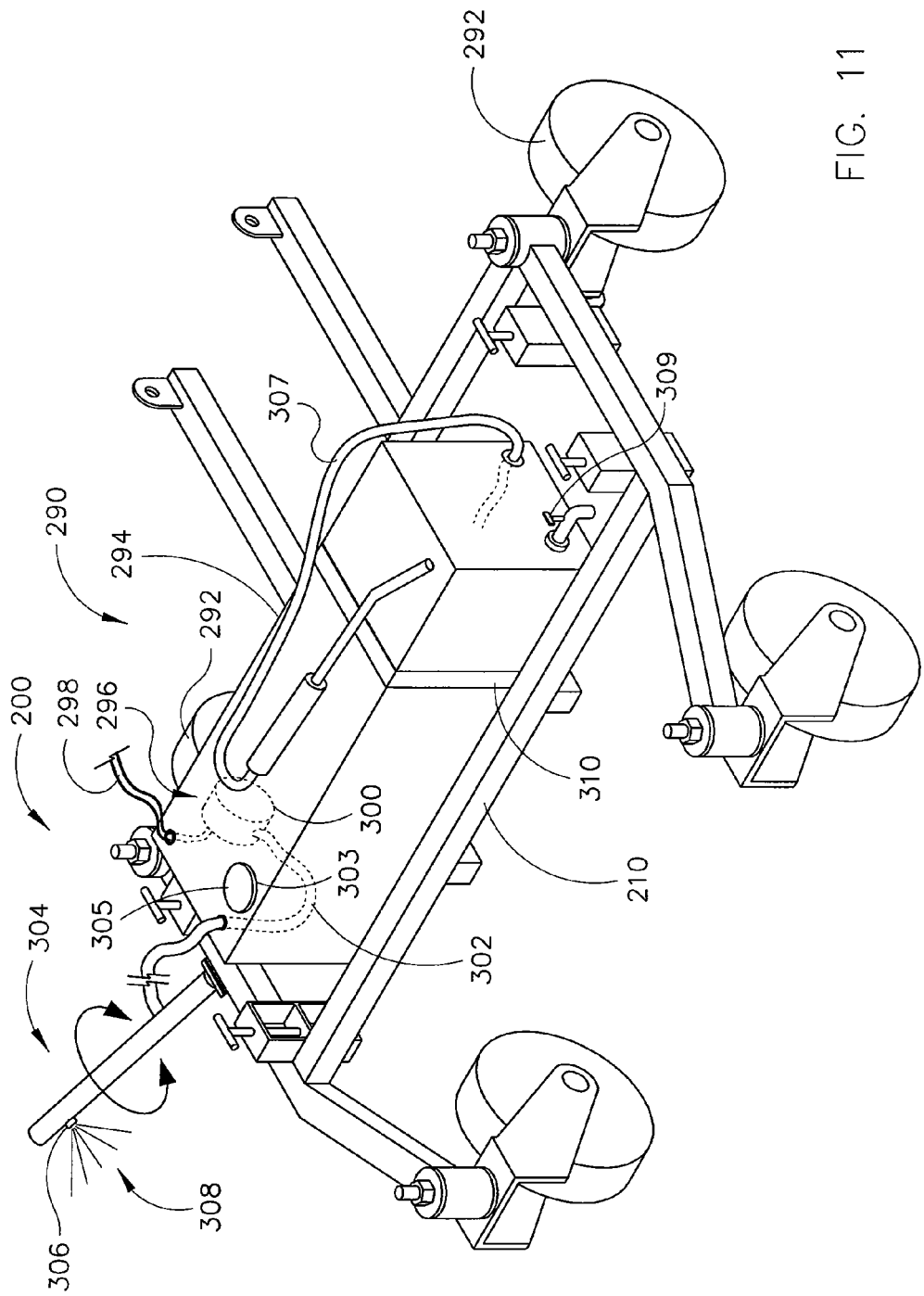
Figure 12:
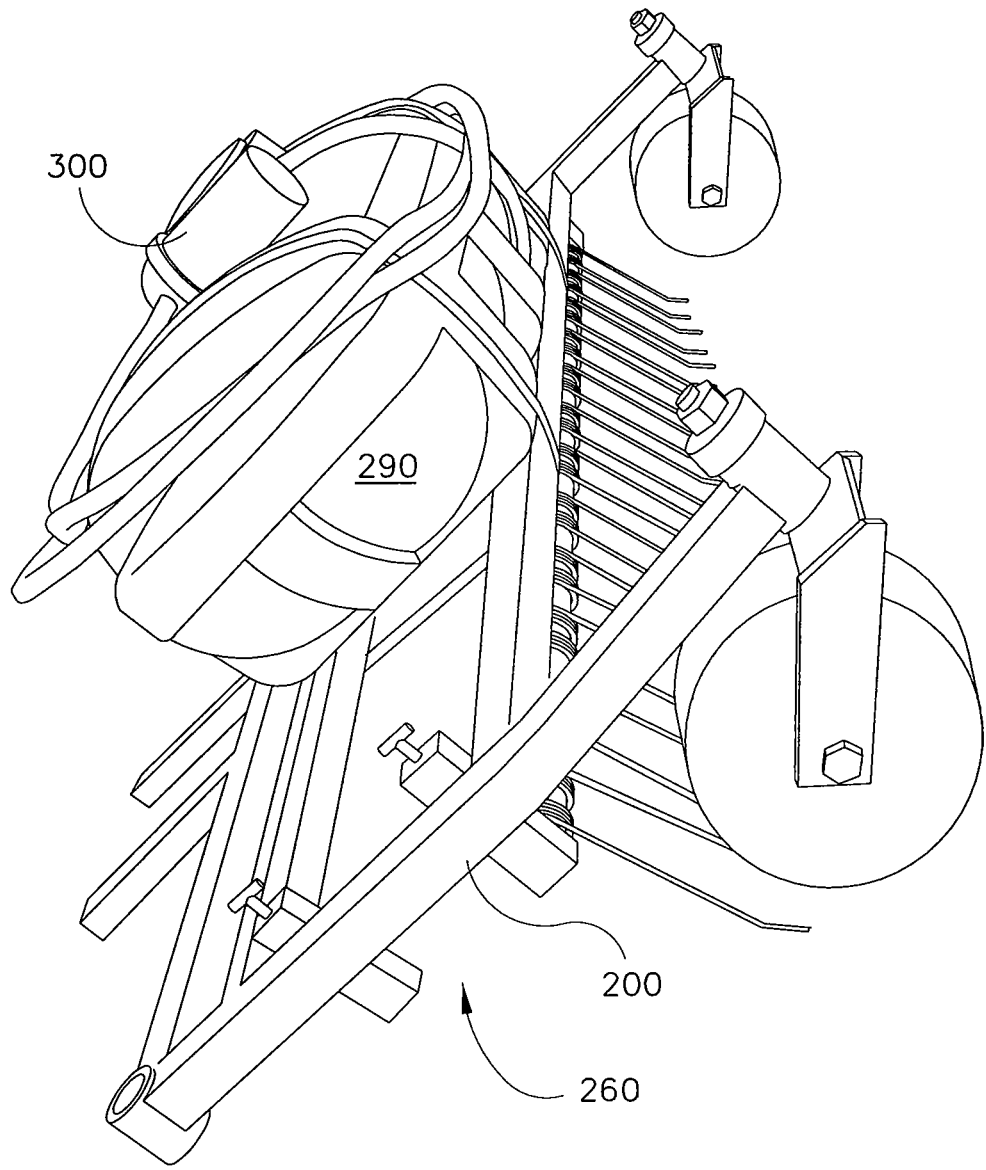
Figure 13:
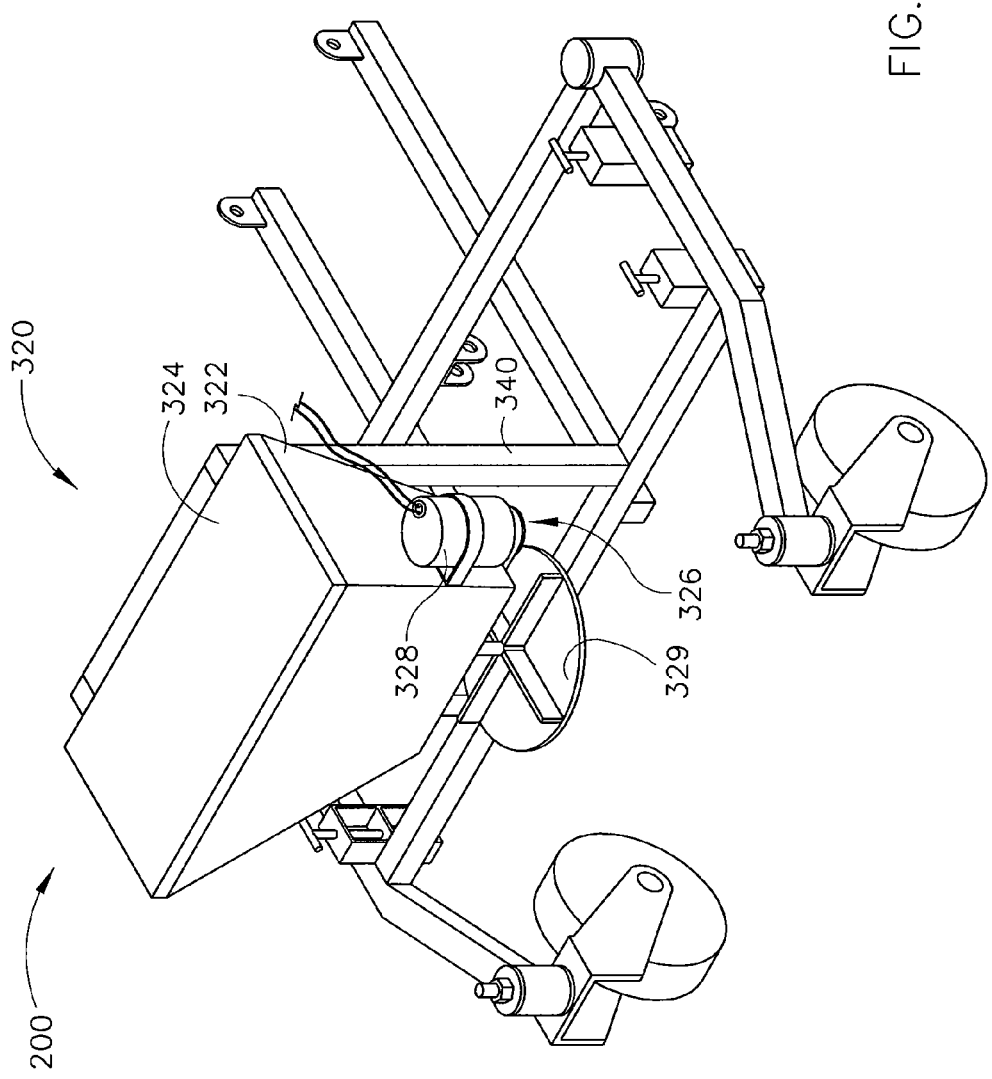

FIGS. 11, 12, and 13 show additional implements that can be supported by accessory mounting system 200. As shown in FIGS. 11 and 12, a spraying implement or spraying system 290 can also be attached to and supported by space frame 210. It is envisioned that for larger and/or heavier implement systems, such as full fluid spraying systems, accessory mounting system 200 can be provided with optional supplemental casters 292 for assisting with supporting a portion of the load associated with the fluid distributed with spraying system 290. Spraying system 290 includes a container 294 for containing fluids intended to be applied to ground areas. It is further envisioned that spraying system 290 be used for applying fluid materials to greenery such as trees and shrubs. Those skilled in the art will appreciate that spraying system 290 can be configured to apply liquid weed treatments, fertilizers, liquid fruit treatments such as bug or pest inhibiters, and/or liquid snow and/or ice treatment solutions.

Spraying system 290 includes a pressurization system for pressuring the fluid in container 294. As used herein, pressurization merely refers to generating a pressure differential for the spray application of the fluid contained in container 294. In a preferred embodiment, spraying system 290 includes a pump system 296 having an electrical connection 298 such that pump system 296 can be powered by a vehicle power system, such as the power system of zero-turn lawnmower 14. Alternatively, spraying system 290 could be provided with an independent or self supported power source and/or a manual hand pump for pressuring container 294. Alternatively, spraying system 290 can include a ground driven gear train whereby translation of spraying system 290 relative to a ground surface rotates a wheel or drives a piston which in turn generates pressurizes the contents of container 294.

As shown in FIG. 11, in a preferred embodiment, pump system 296 includes a pump 300 having an output or discharge 302 that is fluidly connected to a boom 304 and/or a spot sprayer 307. Boom 304 can be pivotably supported by space frame 210 and/or pivotably connected to spraying system 290 such that booms 304 are pivotably supported with respect to container 294. One or more nozzles 306 are supported by boom 304 and generate a spray pattern 308 associated with applying liquid materials to a groundcover when boom 304 is oriented in a generally horizontal position. It is further envisioned that boom 304 can be used to efficiently apply liquid treatments to shrubs and/or hedges by maintaining boom 304 in a generally vertical orientation. Although only one boom 304 is shown, it is further envisioned that another boom can extend from spraying system 290 in a generally opposite direction from boom 304 so as to increase a ground area that can be treated during each pass of the vehicle.

Container 294 of spraying system 290 includes a fill opening 303 that cooperates with a removable cap 305. Fill opening 303 and removable cap 305 are preferably sized to accommodate deposition of fluid as well as dissolvable solid and/or liquid concentrated treatment media within container 294. It is further envisioned that container 294 include a drain valve assembly 309 for allowing unapplied fluid treatment materials to be removed from spraying system 290. Although shown in a lateral side portion of container 294, drain valve assembly 309 can also be located at a rearward facing side of container 294 so that raising of space frame 210 (as shown in FIG. 12) directs the unused fluid treatment material toward drain valve assembly 309. Alternatively, it is envisioned that the bottom of container 294 could be contoured to direct the fluid material toward drain valve assembly 309 so that unused treatment media can be reclaimed for future use. It is further envisioned that one or more of the fluid connections between spot sprayer 307 and booms 304 could include a selectively operable drain valve assembly so that container 294 can be drained via operation of the pressurization of the container 294 and/or operation of pump 300.

Regardless of the number and direction of booms, nozzles 306 are preferably spaced so as to generate a uniform application of the liquid material. As described above, spraying system 290 is particularly suitable for applying liquid fertilizer and/or liquid weed control products to both ground cover and vertical greenery. When not in use, spraying system 290 can be removed from accessory mounting system 200 and/or remain secured thereto via one or more adjustable straps 310 or the like.

As shown in FIG. 12, spraying system 290 cooperates with accessory mounting system 200 so as to allow concurrent use of spraying system 290 and dethatching system 260. When in the raised position as shown in FIG. 12, dethatching system 260 is raised with respect to the underlying ground surface. Although spraying system 290 is also in a "raised" orientation, the delivery system associated with pump 300 remains operable such that spraying system 290 can remain operable even though implement mounting system 200 is raised. Such a configuration increases the functionality of implement mounting system 200 by limiting the user interaction that is required to configure the implements in a desired configuration with respect to implement mounting system 200.

FIG. 13 shows accessory mounting system 200 equipped with another implement in the form of a spreader implement 320. It is appreciated that although spreader implement 320 is shown as what is commonly understood as a broadcast spreader, it is envisioned that spreader implement 320 could also be configured as a drop spreader. Spreader implement 320 includes a container 322 having an optional cover 324 that is removably or pivotably attached to container 322. Spreader implement 320 includes a drive system 326 that rotates a broadcast wheel 329 and preferably an agitator positioned within container 322.

As shown, drive system 326 includes a motor 328 that is preferably powered by the power system of lawnmower 14. Alternatively, it is envisioned that spreader implement 320 include a power source such as a battery for powering motor 328. Alternatively, a mechanical drive system could be provided wherein interaction with a ground surface by a drive wheel facilitates operation of broadcast wheel 329. Such constructions are fairly common to manual push-type broadcast spreaders.

Regardless of the source of the drive power, broadcast spreader implement 320 is generally understood to broadcast seed and/or dry granular ground cover treatments, such as seed, weed and/or fertilizer treatments, salt, etc., across a forward directed area that is commonly larger and wider than the footprint associated with lawnmower 14. Such systems provide desired coverage of dry materials across any area that is generally wider than the travel path of lawnmower 14. Furthermore, supporting the material to be spread with accessory mounting system 200 reduces the user's effort with respect to the application of such materials.

When used with spreader implement 320, implement mounting system 200 preferably includes a removable or collapsible support arm assembly 340 that extends in a generally upward direction. Support arm assembly 340 extends upward along container 322 and is oriented so as to not interfere with the operation of the distribution system of spreader implement 320. It is appreciated that support arm assembly 340 could be integrally formed with spreader implement 320 and/or that spreader implement 320 could be configured to otherwise removably interact with implement mounting system 200. As described above, mounting system 200 is configured to cooperate with a number of ground and/or land care implements. It is further appreciated that, although mounting system 200 is shown as concurrently supporting one or more implements, mounting system 200 could be configured to allow concurrent and/or selective operation of any number of ground care implements.

It is envisioned that each of the material application devices, i.e. spraying system 290 or spreader implement 320, be provided with a control device such as a positional switch or the like, that allows operator manipulation of operation of the implement from the seat area of lawnmower 14. For those embodiments wherein the implement is powered by interaction with a ground surface, it is appreciated that raising accessory mounting system 200 via operation of actuator 220 would suspend application of the respective treatment material. To unify operation of each of the respective implements, it is envisioned to provide a positional switch such that the delivery mechanism is operable only when the accessory mounting system 200 is in an operating or non-raised position. Such switches would suspend operation of the delivery system when the accessory mounting system 200 is moved to a non-use or inclined position. It is further envisioned that such a control switch be integrated into the respective motor or pumps of the delivery system or into the structure of the accessory mounting system whereby an interference is generated that turns the implement "OFF" when the implement is raised. Such a configuration simplifies use of the various implements with a simple up is for no treatment, down is for treatment paradigm. It is further envisioned that the accessory mounting system 200 include a "permanent" multi-pinned electrical connection with lawnmower 14 such that the various implements and actuator 220 can be integrated in a simple plug and go paradigm.

Whether accessory mounting system 200 is equipped with one, more than one, or even all of the implements disclosed herein, or other more aggressive implements such as engine powered rototillers, cultivators, and/or cultipackers, accessory mounting system 200 provides a convenient and expeditious manner of supporting a variety of land care implements for operation with a zero-turn lawnmower. It is also envisioned that mounting system 200 can include a lift jack assembly for raising at least the forward facing portion of the mower to effectuate service and/or cleaning of components of mower 14. Those skilled in the art will appreciate that such a lifting function can be performed by the down pressure generated by actuator 220 and/or connecting a supplemental lift lever to the space frame and actuator 220. Furthermore, when not in use, and using lawnmower 14 for cutting grass, accessory mounting systems 10, 200 can be quickly removed from the lawnmower 14 in a substantially, if not completely, toolless manner. Furthermore, the ability of accessory mounting system 200 to support a variety of implements reduces the expense that is commonly associated with owning and maintaining the variety of implements associated with the present accessory system.

FIGS. 14-34 show a non-highway vehicle, such as a zero-turn lawnmower 404, equipped with an implement or accessory mount or mounting system 400 according to another embodiment of the invention. Unlike mounting systems 10, 200, the mounting systems described hereafter are constructed to allow vertical pitching of the implements attached thereto. That is, as described further below, mounting system 400 allows vertical adjustment of the opposite lateral ends of the implement supported thereby. Said in another way, the mounting systems described hereafter are constructed so that the implement can be raised and lowered, rotated in left or right side-to-side horizontal pitch directions, and rotated about an axis that is generally aligned with a longitudinal axis of the underlying vehicle. Although perhaps not desirous for all users, the forthcoming mounting systems have greater versatility with respect to the orientation of an implement relative to the vehicle as compared to mounting systems 10, 200.

Mounting system 400 includes a clamp assembly 402 that is secured to vehicle 404 and a space frame 406 that removably cooperates with clamp assembly 402. The construction of vehicle 404 is generally the same as the construction of vehicle 14 as described above with respect to FIG. 1. Although vehicle 404 is also shown as a zero-turn lawnmower, it is appreciated that mounting system 400 is also useable with other non-highway off-road vehicles as defined elsewhere herein such as ATV'S, UTV's and the like. Mounting system 400 preferably includes an electrical system or wiring harness 412 that is configured for integration with the electrical system of a particular vehicle 404. Those skilled in the art will appreciate that wiring harness 412 may have a variety of alternative constructions tailored for cooperation with underlying vehicles of different configurations.

Figure 15:
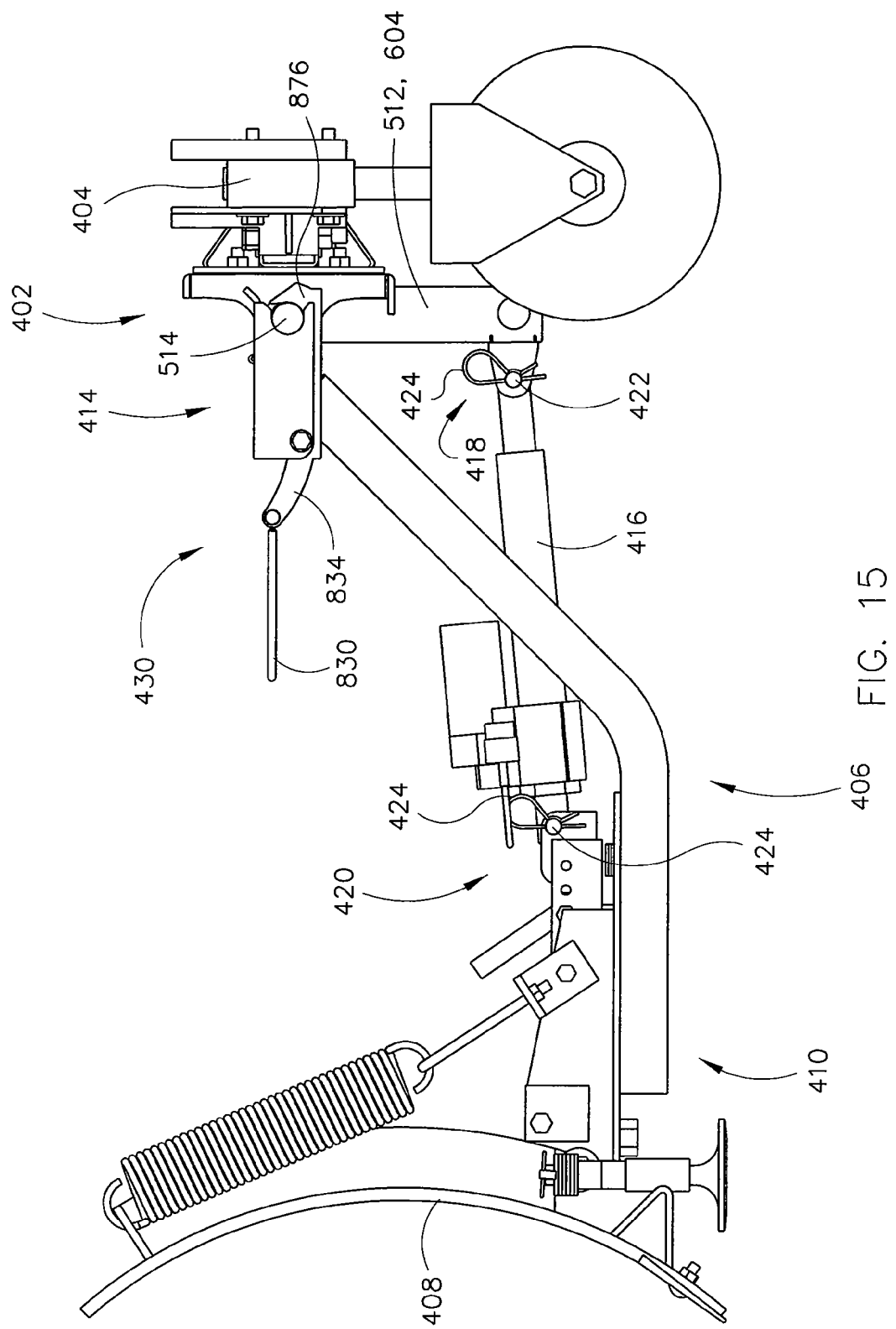
FIG. 15 is a side elevation view of the accessory mounting system shown in FIG. 14.

As shown in FIG. 15, space frame 406 extends in a forward direction from clamp assembly 402 relative to vehicle 404. In a preferred embodiment, an implement 408, such as a plow blade assembly, is attached to a forward facing end 410 of space frame 406 and a rearward facing end 414 of space frame 406 removably engages clamp assembly 402. Although shown as a plowing system, it is appreciated that mounting system 400 is useable with other implements such as those described above with respect to the preceding embodiments. It is further appreciated that although implement 408 is shown as being positioned at a location that is generally forward of space frame 406, implement 408 could be oriented so as to extend above or below space frame 406 as defined by the particular use of the implement 408. For example, it is appreciated that a dethatcher implement would be positioned to extend at least somewhat below space frame 406 whereas a sprayer or spreader could be configured to extend in an area that is generally between the members or above space frame 406.

Figure 14:
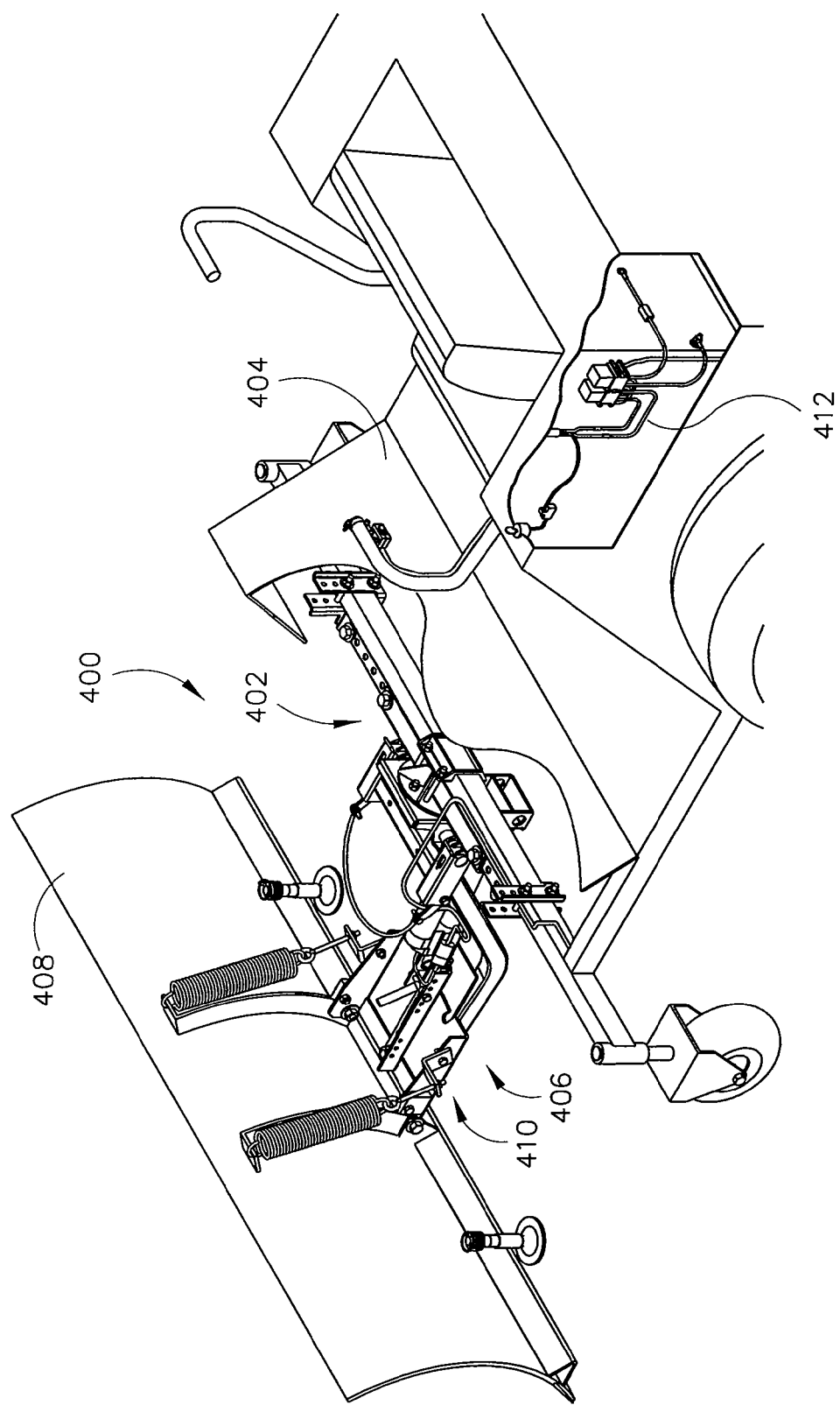
FIG. 14 is a rear perspective view of an implement or accessory mounting system according to another embodiment of the invention attached to a vehicle and having a plow attached thereto.
Figure 16:
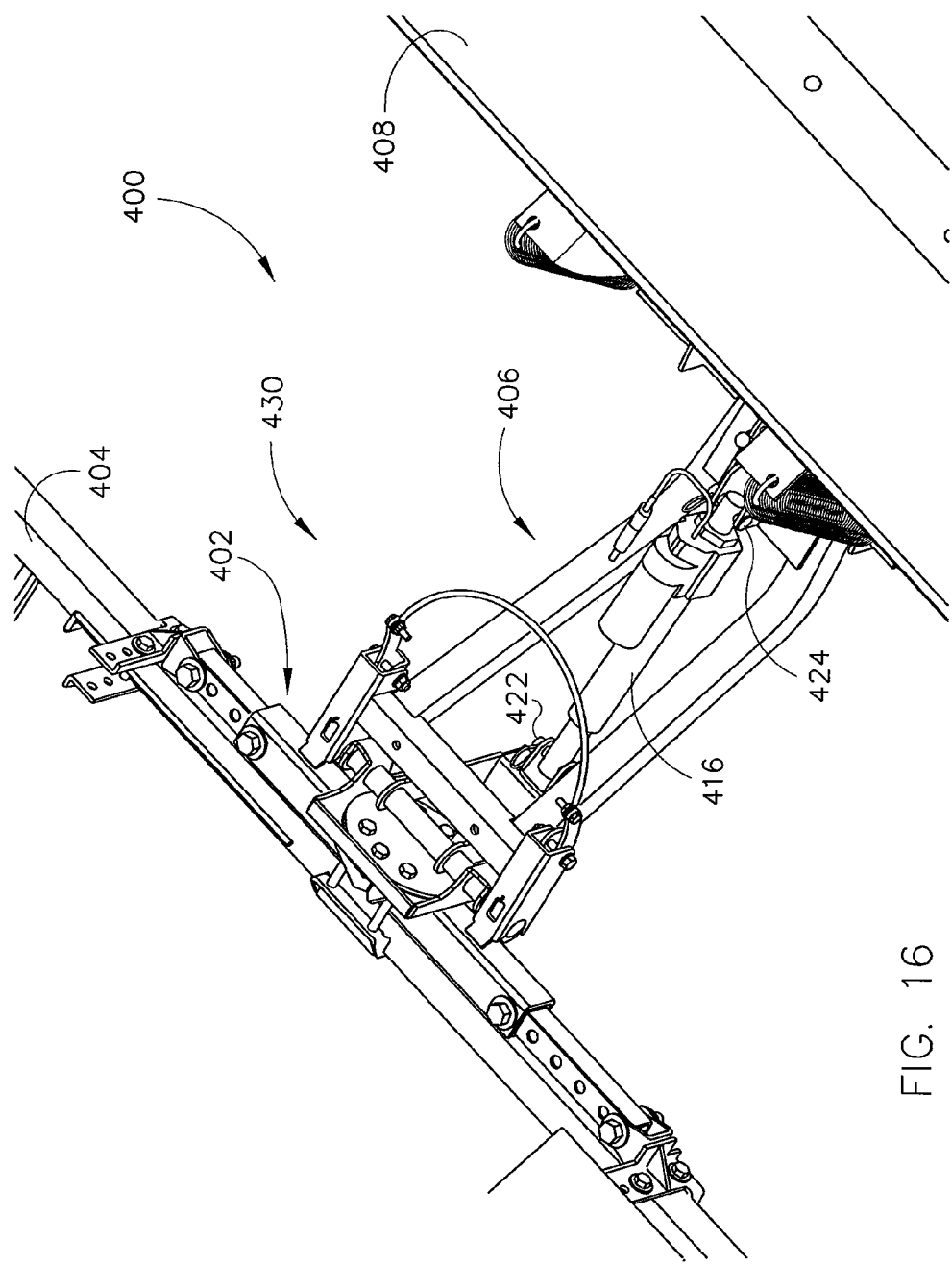
FIG. 16 is a top perspective view of the system shown in FIG. 14.
Figure 17:
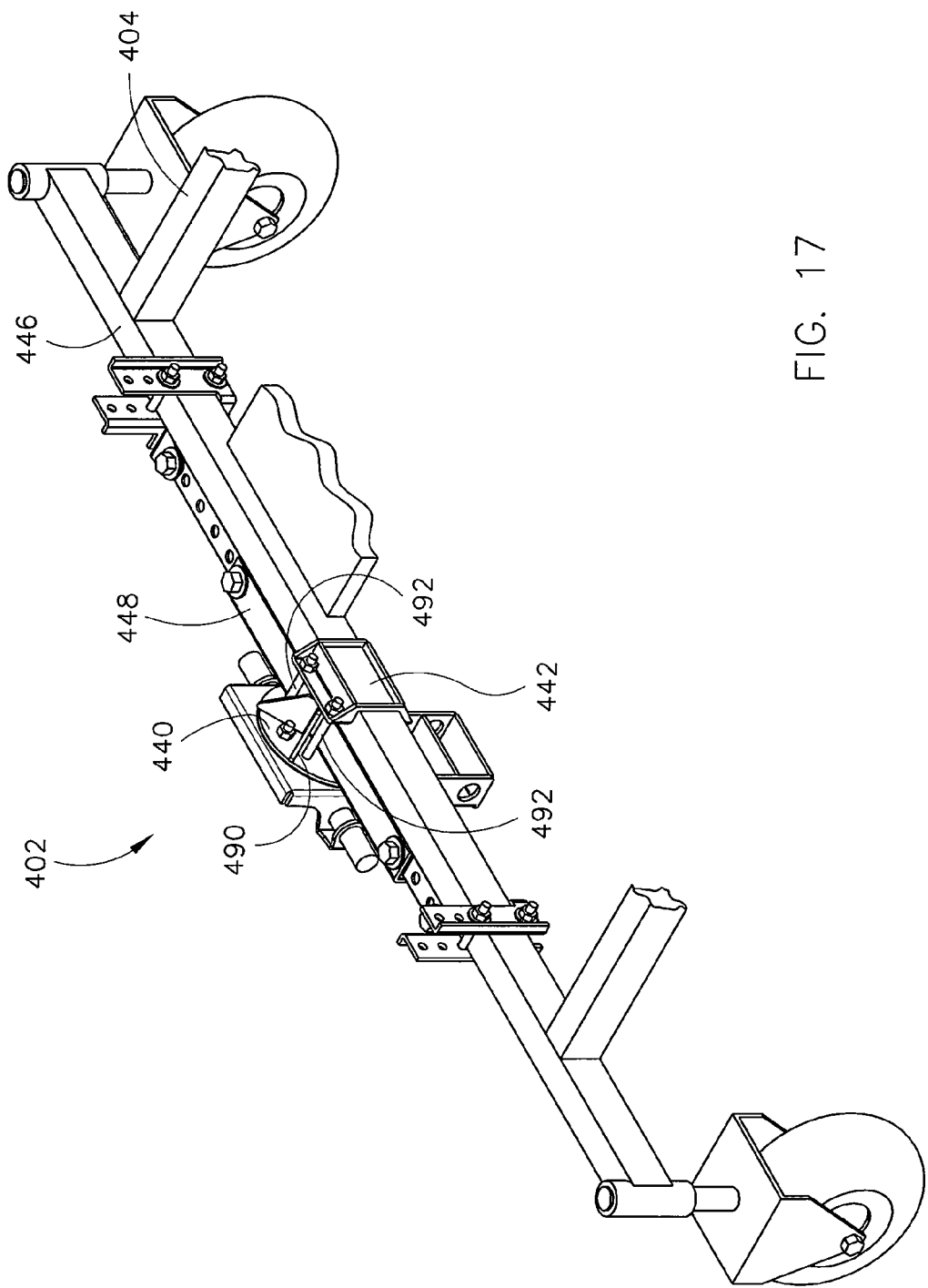
FIG. 17 is a rear perspective view of one embodiment of a clamp assembly of the mounting system shown in FIG. 14 attached to a vehicle and an implement supporting space frame disengaged therefrom.

Still referring to FIGS. 14-16, mounting system 400 includes an actuator 416. Actuator 416 is generally the same as actuator 60 as shown and described above. Actuator 416 includes a first or rearward facing end 418 that removably engages clamp assembly 402 and a second or forward facing end 420 that removably engages space frame 406. A clevis pin 422, 424 or the like slidably engages opposite ends 418, 420 of actuator 416 and pivotably connects actuator 416 to clamp assembly 402 and space frame 406, respectively. A cotter pin 424 or the like cooperates with each clevis pin 422, 424 so as to selectively secure each clevis pin 422, 424 with respect to clamp assembly 402 and space frame 406, respectively. It is appreciated that other mounting arrangements, such as a bolt and nut pair or pins having integral catch or closure mechanisms, could be used to secure the respective ends of actuator 416 with respect to mounting system 400 and vehicle 404. Regardless of the given connection methodology, it is envisioned the actuator 416 be quickly and expeditiously associated with mounting system 400 and removable from mounting system 400 and/or vehicle 404.

As shown in FIG. 16, and described further below with respect to FIG. 30, mounting system 400 includes a latch assembly 430 that provides a tool-less severable connection between space frame 406 and clamp assembly 402. When opened, latch assembly 430 remains attached to space frame 406 and, provided one of clevis pins 422, 424 and any electrical connections associated with of actuator 416 have been removed, allows unfettered separation between vehicle 404 and implement 408. Preferably, mounting system 400 is configured to allow both engagement and disengagement of space frame 406 and the corresponding implement 408 from vehicle 404 without the use of hand tools or the like. As described further below, space frame 406 and clamp assembly 402 cooperate in a severable manner so that at least a portion of clamp assembly 402 remains attached to vehicle 404 when an implement is removed therefrom.

FIGS. 16-24 show one embodiment of clamp assembly 402 according to the present invention. Clamp assembly 402 includes a back plate 440 that cooperates with a center mount bracket 442 to capture a frame member 446 of vehicle 404. Preferably, an optional telescoping mount assembly 448 is also captured between back plate 440 and center mount bracket 442. Mount assembly 448 includes a center tube 450 that telescopically cooperates with alternate extension or end arms or tubes 452, 454 in a manner similar to clamp assembly 202 as described above. A pin or fastener 456 cooperates with a passage 458 formed in the alternate ends of center tube 450 so that end tubes 452, 454 can be secured to center tube 450 in any number of configurations. A number of corresponding passages 458 are formed in end tubes 452, 454 and provide a variable connection configuration of center tube 450 and end tubes 452, 454.

A hanger bracket assembly 460 pivotably cooperates with an outboard end 462 of each end tube 452, 454 so as to provide greater lateral stability to the mounting of clamp assembly 402. Each hanger bracket assembly 460 includes a cavity 464 that is configured to capture frame member 446 of vehicle 404. Each cavity 464 is defined by the cooperation of two hanger bracket plates 461, 463. Alternatively, each hanger bracket assembly 460 could be constructed of a unitary body having a generally continuous U-shape wherein the frame member 446 is captured within the area that is generally enclosed by the U-shape.

Figure 18:
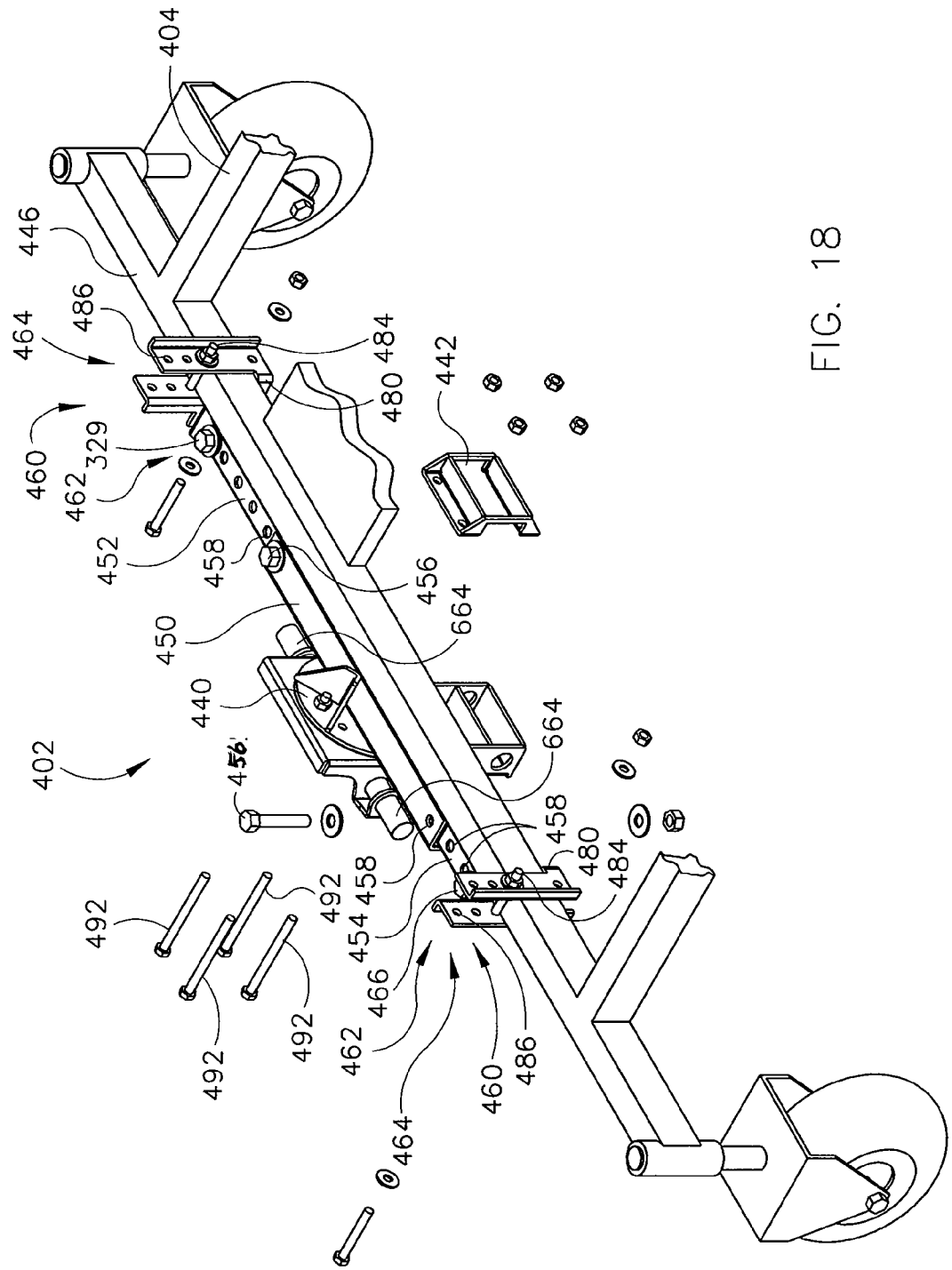
FIG. 18 is a view similar to FIG. 17 with the clamp assembly shown partially exploded therefrom.
Figure 19:
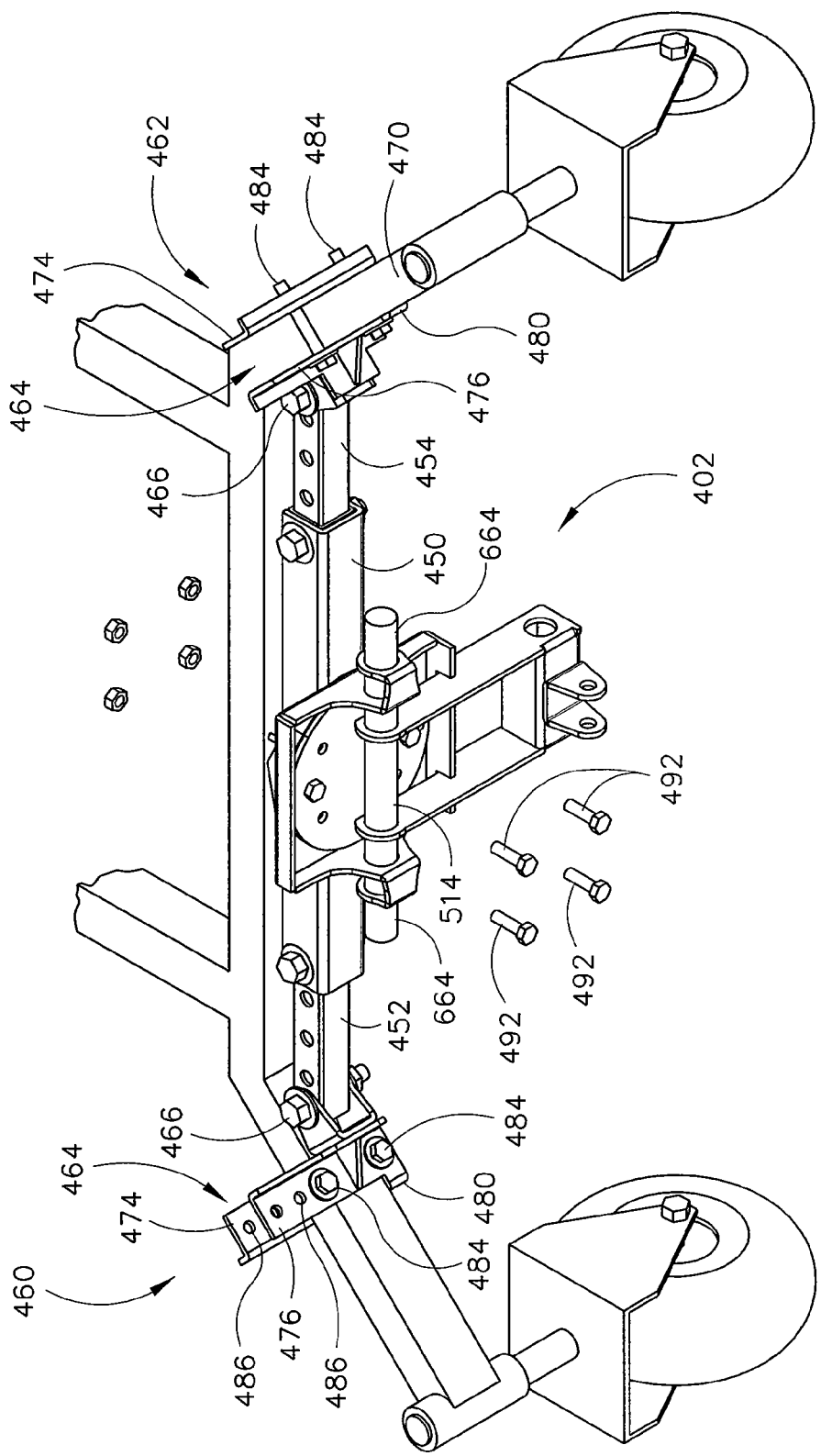
FIG. 19 is a forward perspective view of the clamp assembly shown in FIG. 17 in an alternate configuration so as to cooperate with an underlying vehicle having a forward facing configuration that is different than that shown in FIG. 17.

A pivot pin 466 secures each frame hanger bracket assembly 460 to outboard end 462 of each end tube 452, 454. Comparing FIGS. 18 and 19, the alternate end hanger bracket assemblies 460 and adjustability of end tubes 452, 454 with center tube 450 of clamp assembly 402, allows clamp assembly 402 to be secured to a vehicle having a generally straight lateral forward frame member 446, as shown in FIG. 18, and vehicles having alternate frame constructions, such as a contoured forward frame member 470, as shown in FIG. 19. The adjustable or selective configuration of clamp assembly 402 increases the number of the vehicle configurations with which the clamp assembly 402 can be configured to cooperate.

Regardless of the specific orientation of frame hanger bracket assembly 460 with respect to corresponding end tubes 452, 454, each frame hanger bracket assembly 460 includes a pair of upstanding walls 474, 476 and a web wall 480 that extends in a crossing direction with respect to walls 474, 476 so as to generally define cavity 464. One or more fasteners 484 cooperate with a number of aligned openings 486 that are formed in upstanding walls 474, 476. Fasteners 484 clamp walls 474, 476 about frame member 446 and functionally secure center tube 450 and telescopic tubes 452, 454 relative to vehicle 404. Understandably, if frame member 446 is robust enough to withstand the rigors associated with the operation of intended implement, back plate 440 of clamp assembly 402 could be secured directly to such a frame member thereby omitting telescoping mount assembly 448. Unfortunately, few if any zero-turn lawnmowers have a forward facing frame member that is constructed in a manner sufficient to independently support mounting system 400.

Figure 22:
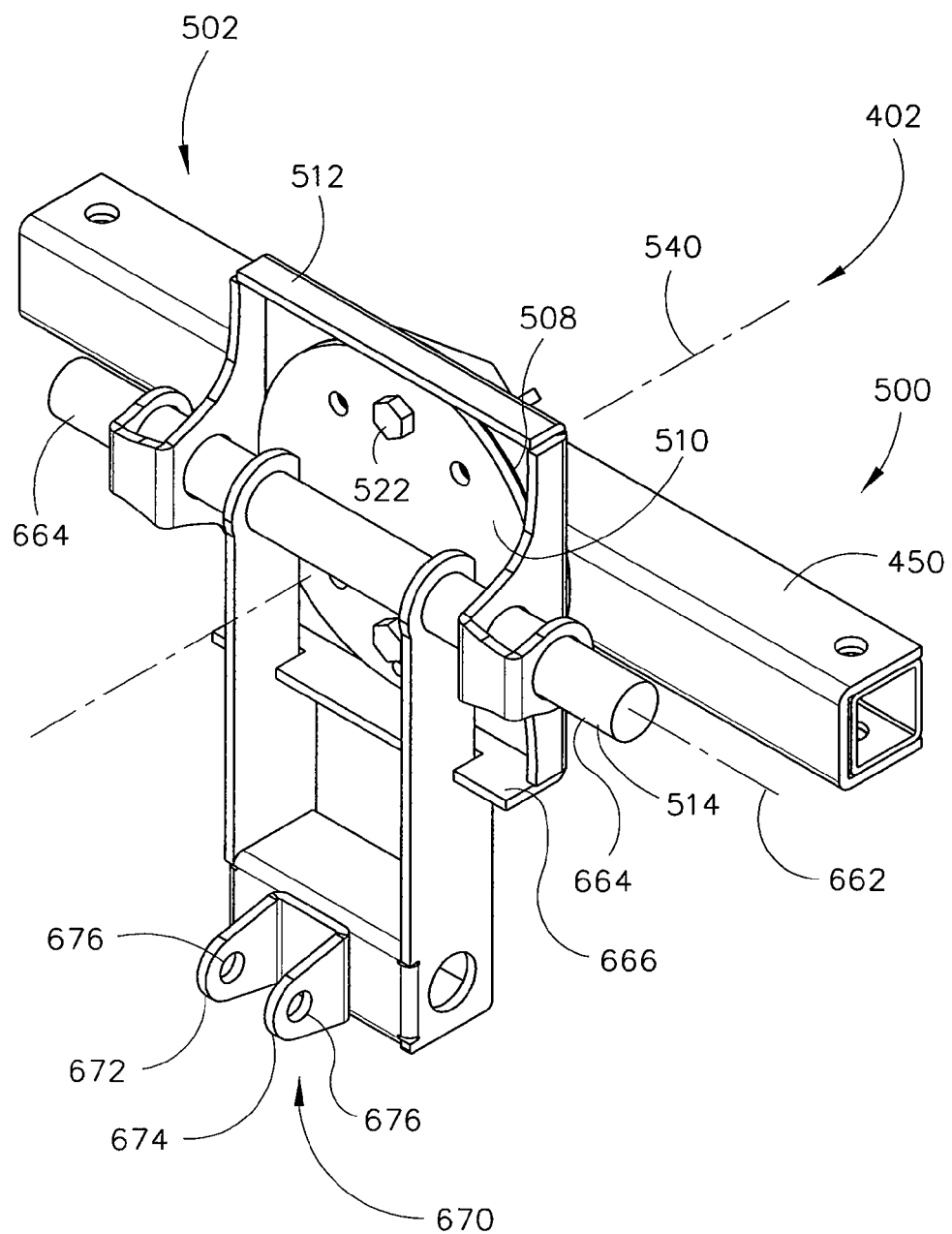
FIG. 22 is a view similar to FIG. 20 and shows the clamp assembly with adjustable side arm assemblies removed therefrom.
Figure 23:
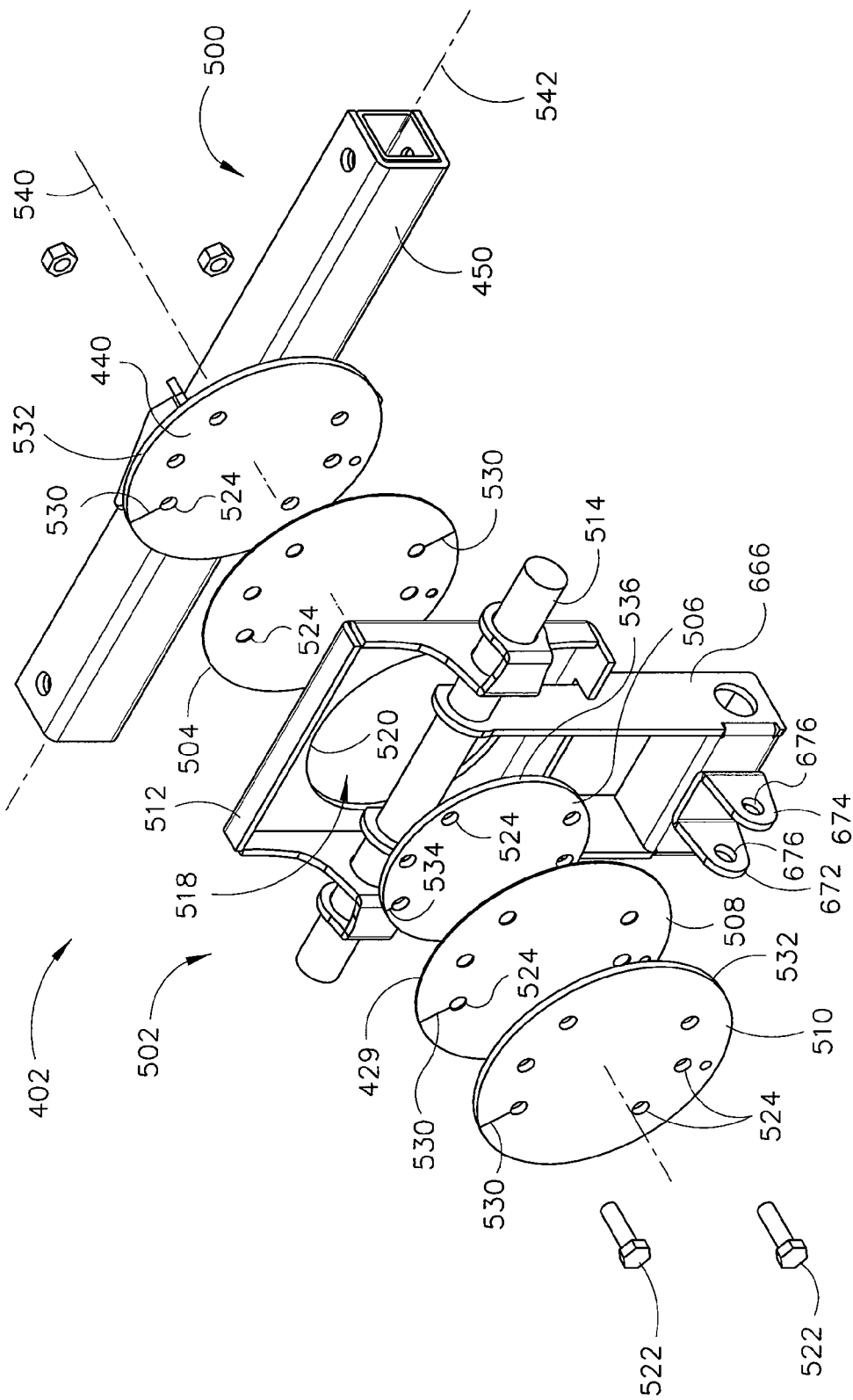
FIG. 23 is a perspective exploded view of the clamp assembly shown in FIG. 22.

Referring back to FIG. 17, back plate 440 includes one or more optional gussets 490 that extend outward from back plate 440 in a generally rearward direction. Gussets 490 generally flank frame member 446 and center tube 450. As shown in FIGS. 22-23, a number of fasteners 492 extend through back plate 440 and cooperate with center mount bracket 442 so as to positionally fix back plate 440 relative to vehicle 404. Still referring to FIGS. 22-23, clamp assembly 402 includes a first portion 500 and a second portion 502. First portion 500 of clamp assembly 402 includes back plate 440, center mount bracket 442, and a number of disks 504, 506, 508, 510 that are attached thereto. First portion 500 is maintained in a fixed position with respect to vehicle 404.

Second portion 502 of clamp assembly 402 includes a swivel plate 512 and a pivot shaft 514 that is fixedly attached thereto. Although first and second portions 500, 502 of clamp assembly 402 can remain attached to vehicle 404 when space frame 406 is removed therefrom, second portion 502 of clamp assembly 402, swivel plate 512 and pivot shaft 514, is pivotably with respect to first portion 500 of clamp assembly 402.

Swivel plate 512 includes an opening 518 formed therethrough. Disk 506 forms a center disk that is sized to fit within opening 518. A forward disk 510 and back plate 440, which forms a rearward disk, have a larger diameter than center disk 506 and opening 518. Preferably, back plate 440, center disk 506, and forward disk 510 are constructed of a plate steel or similarly robust material. Comparatively, interstitial or bearing disks 504, 508 are preferably constructed of a low friction material, such as Teflon, and isolate frictional interaction between swivel plate 512 and portions of back plate 440 and front disk 510 that overlap a perimeter edge 520 of opening 518 formed in swivel plate 512. It is appreciated that bearing disks 504, 508 can be omitted and/or replaced with alternate friction reducing features such as a grease fitting or the like. Those skilled in the art will appreciate the disks 504, 508 enhance the operational life of the accessory mounting system and that such disks are considered serviceable so as to further extend the operating life of the system.

A number of fasteners 522 cooperate with a number of aligned openings 524 that are formed in each of disks 504, 506, 508, 510 and back plate 440. As shown in FIG. 22, when assembled, back plate 440 and disks 504, 506, 508, and 510 positioned generally between center tube 450 of first portion 500 of clamp assembly 402 and shaft 514 of second portion 502. Referring to FIG. 23, back plate 440 and disks 504, 508, and 510 have a larger diameter, indicated by a spacing 530 between each opening 524 and a perimeter 532 of each respective disk, than center disk 506. Center disk 506 is provided with a spacing 534 between each opening 524 and an edge 536 of disk 506 so that second portion 502 of clamp assembly 402 is pivotably supported by first portion 500 of clamp assembly 402 via interaction of the disk stack about opening 518 formed in swivel plate 512.

When assembled, swivel plate 512 is freely rotatable about a longitudinal axis 540 that is associated with the origin of the concentric disk stack or the origin of opening 518. Axis 540 is generally aligned with a longitudinal axis of vehicle 404 and is oriented in a generally crossing direction that is preferably transverse to a lateral axis 542 of vehicle 404. Said in another way, the axis of rotation of second portion 502 of clamp assembly 402 relative to first portion 500 is generally orientated in a crossing direction with respect to a longitudinal axis of optional center tube 450. Such a construction ensures a generally orthogonal orientation of an implement with respect to a forward travel direction of the underlying vehicle.

Figure 24:
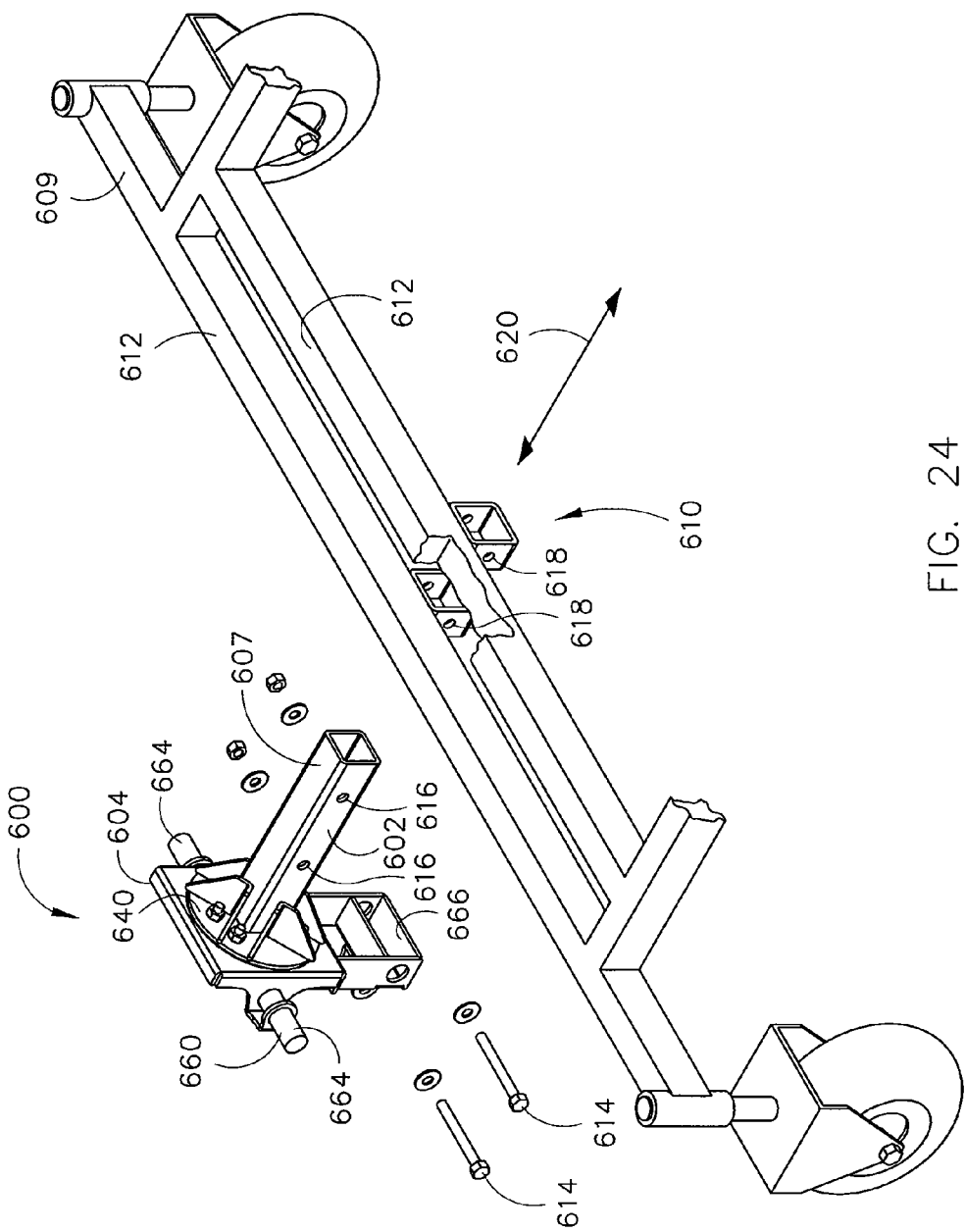
FIG. 24 is a side perspective view of a clamp assembly according to another embodiment of the invention.
Figure 25:
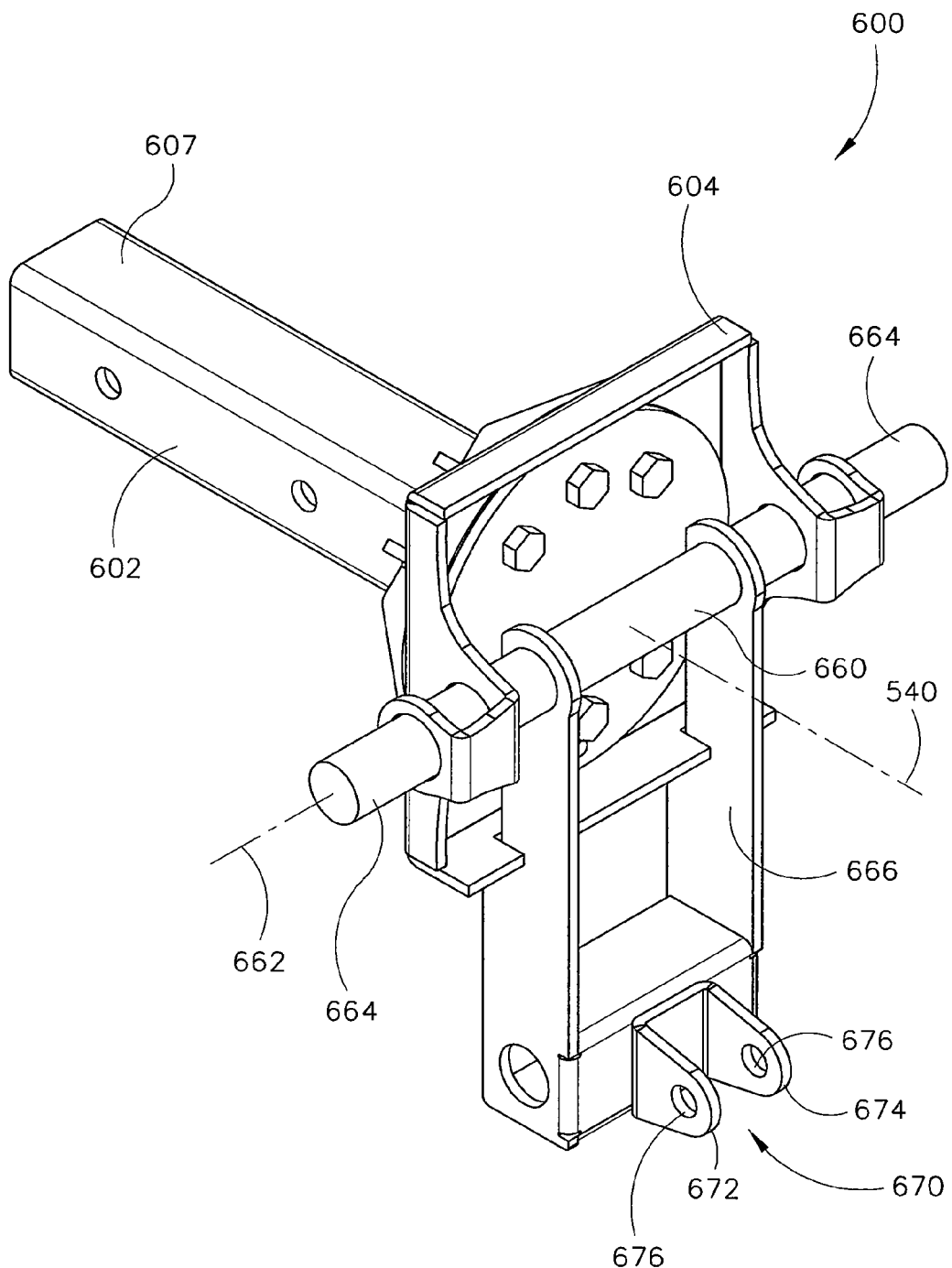
FIG. 25 is a front perspective view of the clamp assembly shown in FIG. 24.
Figure 26:
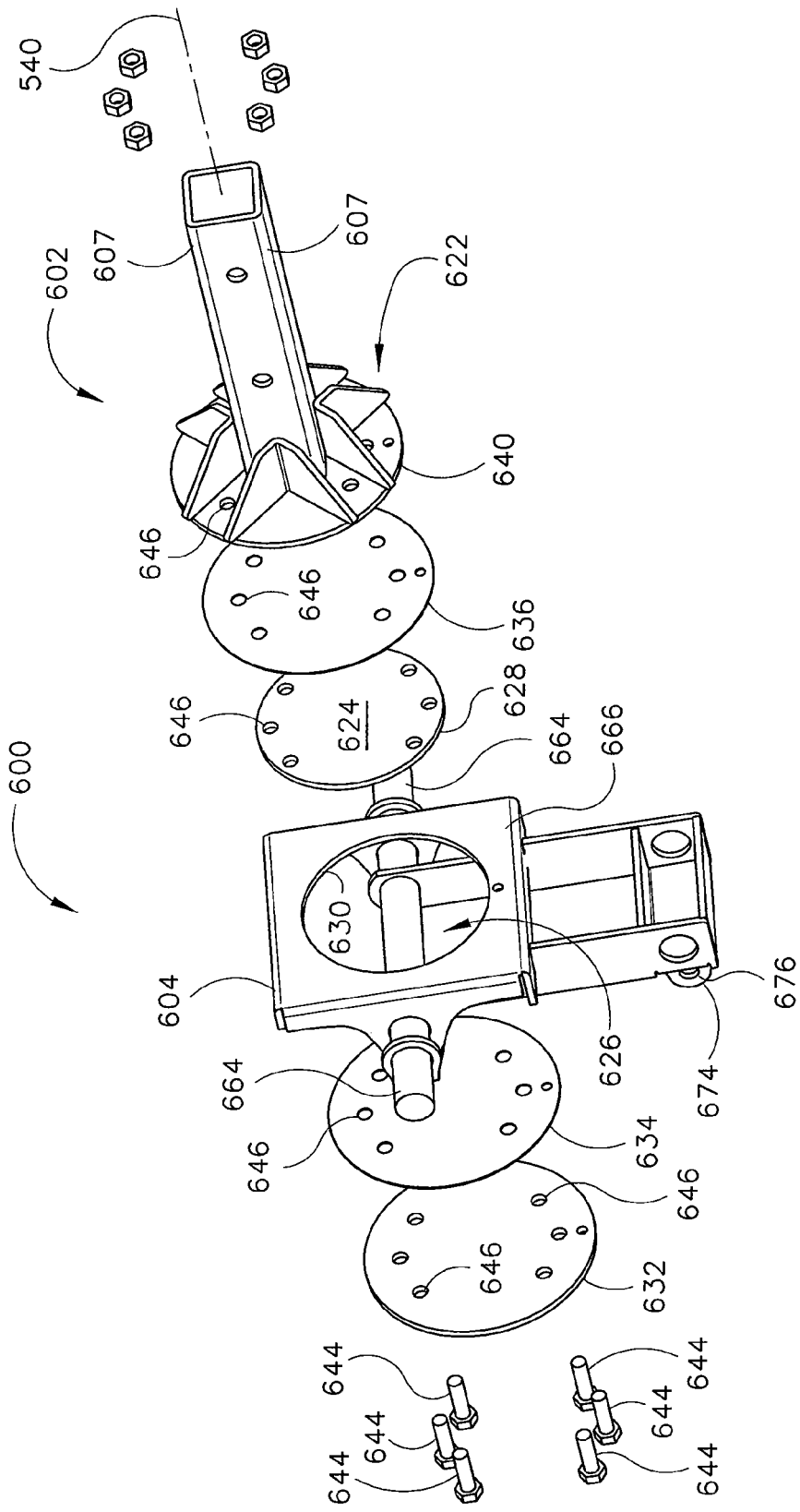
FIG. 26 is a rear perspective view of the clamp assembly shown in FIG. 24.

FIGS. 24-26 show a clamp assembly 600 according to another embodiment of the invention. Clamp assembly 600 also includes a first portion 602 and a second portion 604 that is pivotably connected to the first portion 602. Unlike first portion 502 of clamp assembly 402, first portion 602 of clamp assembly 600 includes a stem or push tube 607 that is constructed to removably engage one or more receivers 610 associated with a vehicle 609. Preferably, receiver 610 is secured to one or more frame members 612 associated with vehicle 609. A pin assembly 614 cooperates with each of the aligned openings 616 formed in each receiver 610. Preferably, stem tube 607 and receiver 610 are sized to cooperate in such a manner as is commonly understood as a vehicle hitch and receiver assembly. That is, those skilled in the art will appreciate that such a receiver and stem tube pair are commonly encountered at the rearward facing side of over the road vehicles such as cars and trucks.

The generally noncircular cooperation between push tube 607 and receiver 610 prevents rotational movement between first portion 602 of clamp assembly 600 and the underlying vehicle 609 and the pinned alignment of openings 616 of push tube 607 with openings 618 of receiver 610 selectively limits longitudinal movement, indicated by arrow 620, of first portion 602 of clamp assembly 600 relative to vehicle 609. Such a construction allows the entirely of clamp assembly 600 to be quickly and conveniently removed from the supporting vehicle.

As shown in FIG. 26, first portion 602 of clamp assembly 600 includes a disk assembly 622 that is similar to that described above with respect to FIG. 23. Disk assembly 622 includes a center disk 624 that is sized to fit within an opening 626 formed in second portion 604 of clamp assembly 600. At outward radial surface 628 of disk 624 interacts with an inwardly directed radial surface 630 of a second portion 604 that faces opening 626.

Disk assembly 622 includes a forward disk 632 and a pair of optional bearing disks 634, 636 that cooperate with center disk 624 and back plate 640 so as to pivotably secure second portion 604 of clamp assembly 600 relative to first portion 602. A number of fasteners 644 cooperate with a number of aligned openings 646 that are formed in each disk 624, 632, 634, 636, and back plate 640. Second portion 604 of clamp assembly 600 is captured between forward disk 632 and back plate 640 with optional bearing disks 634, 636 disposed between center disk 624 in each of forward disk 632 and back plate 640. Those skilled in the art will appreciate that bearing disks 634, 636, are formed of a sacrificial and/or replaceable material, such as Teflon, to limit the metal on metal contact between first portion 602 and second portion 604 of clamp assembly 600 while providing a robust pivotable connection therebetween.

Figure 37:
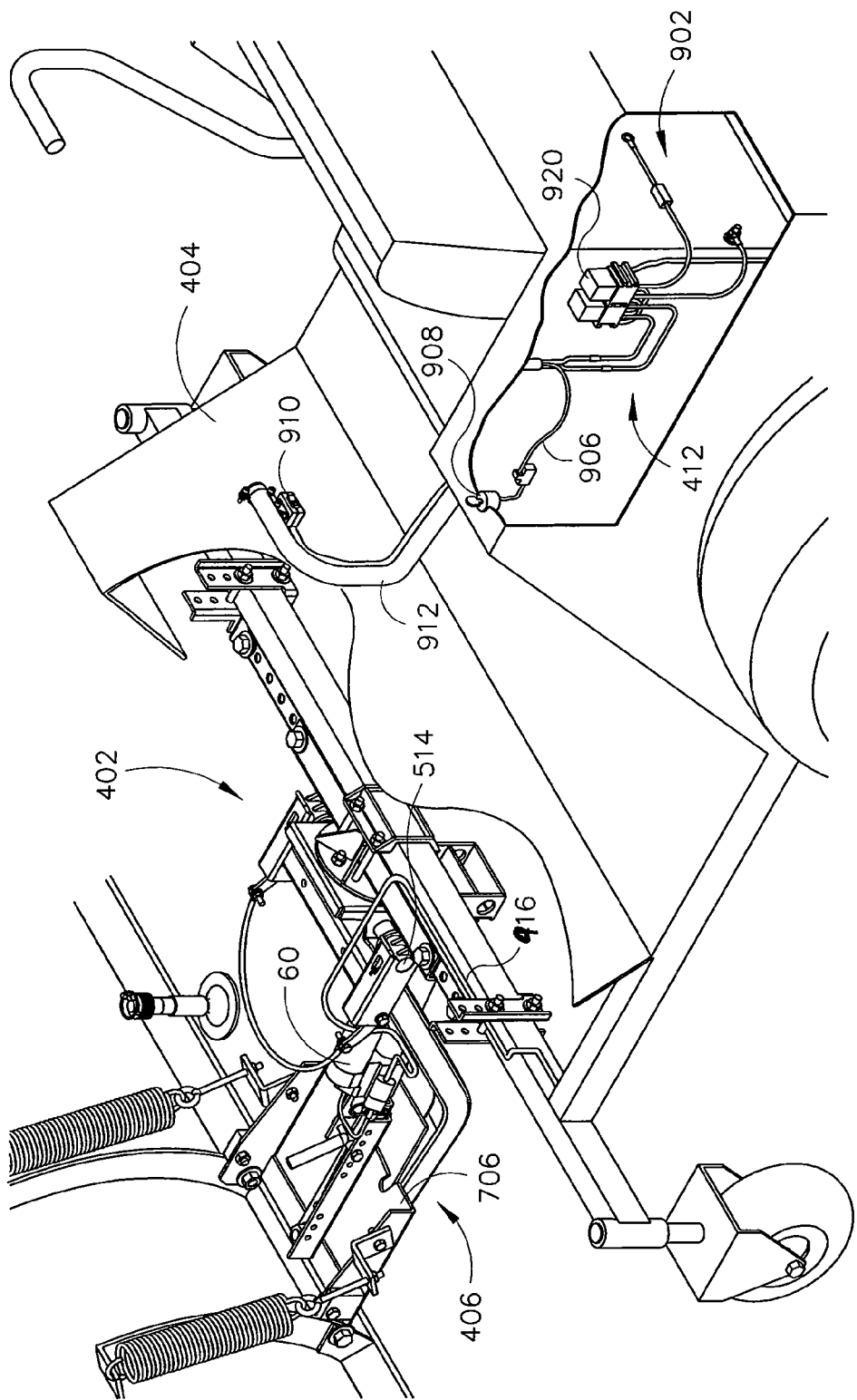
FIG. 37 is a view similar to FIG. 14 and shows connection of the accessory mounting system with the power system of an underlying vehicle such as a zero-turn lawnmower.

Referring to FIGS. 22-26, second portion 502, 604 of each clamp assembly 402, 600 includes a shaft 514, 660 having a longitudinal axis 662 that is oriented in a crossing direction with respect to the axis of rotation 540 of the respective second portion 502, 604 of each clamp assembly 402, 600. Each shaft 514, 660 includes opposite ends 664 that are extend in a generally outboard direction with respect to a body 666 of second portion 502, 604 of the corresponding clamp assembly 402, 600. As discussed further below with respect to FIG. 37, a space frame 406 removably cooperates with the alternate lateral ends 664 of shaft 514, 660. It should further be appreciated that equipment equipped with either of clamp assemblies 402, 600 can cooperate with the same implements. Preferably, each clamp assembly 402, 600 is centrally positioned with respect to the underlying vehicle.

Referring to FIGS. 22 and 25, swivel plate 512, 604 of each second portion 502, 604 is formed of a body 666 having an actuator mount 670 formed by a pair of arms 672, 674 that extend in a generally forward direction from body 666. Each arm 672, 674 includes an opening 676 that cooperates with a fastener 424 or pin for pivotably securing a vehicle end or rearward end of actuator 416 with respect to a respective clamp assembly 402, 600. The pivotable connection between actuator 416 and the corresponding swivel plate 512, 604 allows lateral tilting of an implement attached to a vehicle and supported by either of clamp assemblies 402, 600 in a plane that is generally aligned with a longitudinal axis of swivel plate 512, 604. Said in another way, actuator 416 can rotate about the axis of openings 676 independent of the orientation of swivel plate 512, 604 to first portion 500, 602 of clamp assemblies 402, 600. Clamp assemblies 402, 600 also allow rotation of an implement attached thereto about axis 540 and thereby allow raising and lowering of the right and/or left lateral ends of the implement relative to the vehicle. It is further appreciated that the unencumbered interaction between the first and second portions of each of clamp assemblies 402, 600 allows full rotation of the implement relative to the vehicle except for those instances wherein the implement interferes with a ground surface during such rotation. Preferably, the second portion of each clamp assembly 402, 600 can be rotated between 20 and 360 degrees with respect to the first portion of the corresponding clamp assembly. Although each second portion is preferably fully rotatable relative to the corresponding first portion, it is envisioned that one or more stops be provided between the interaction of first and second portions of clamp assemblies 402, 600 so as to allow only partial rotation of the second portion of the clamp assembly relative to the first portion of clamp assembly.

Figure 27:
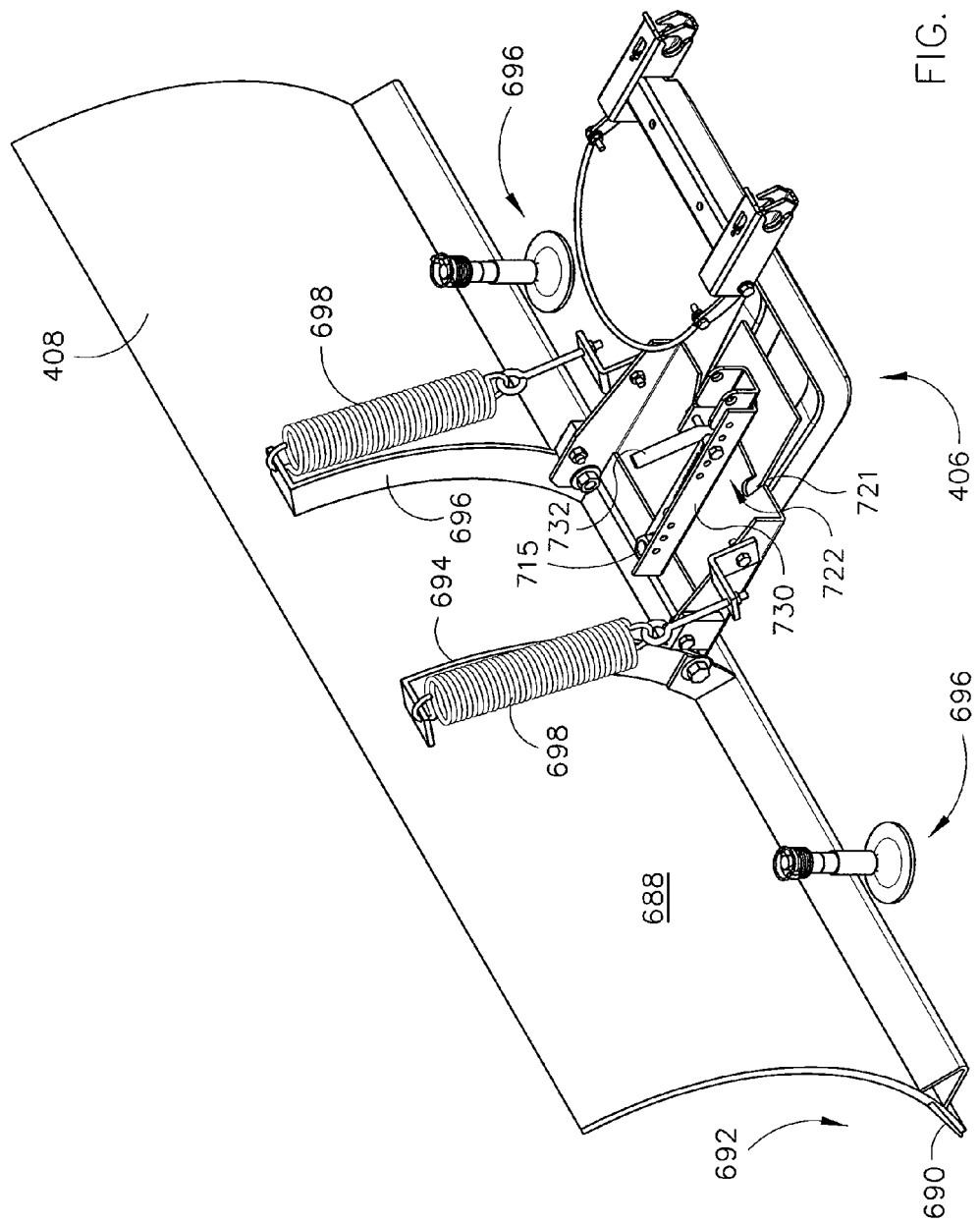
FIG. 27 a rear perspective view of a detachable space frame assembly of the mounting system shown in FIG. 14 that removably cooperates with the clamp assemblies shown in FIGS. 23 and 24.
Figure 28:
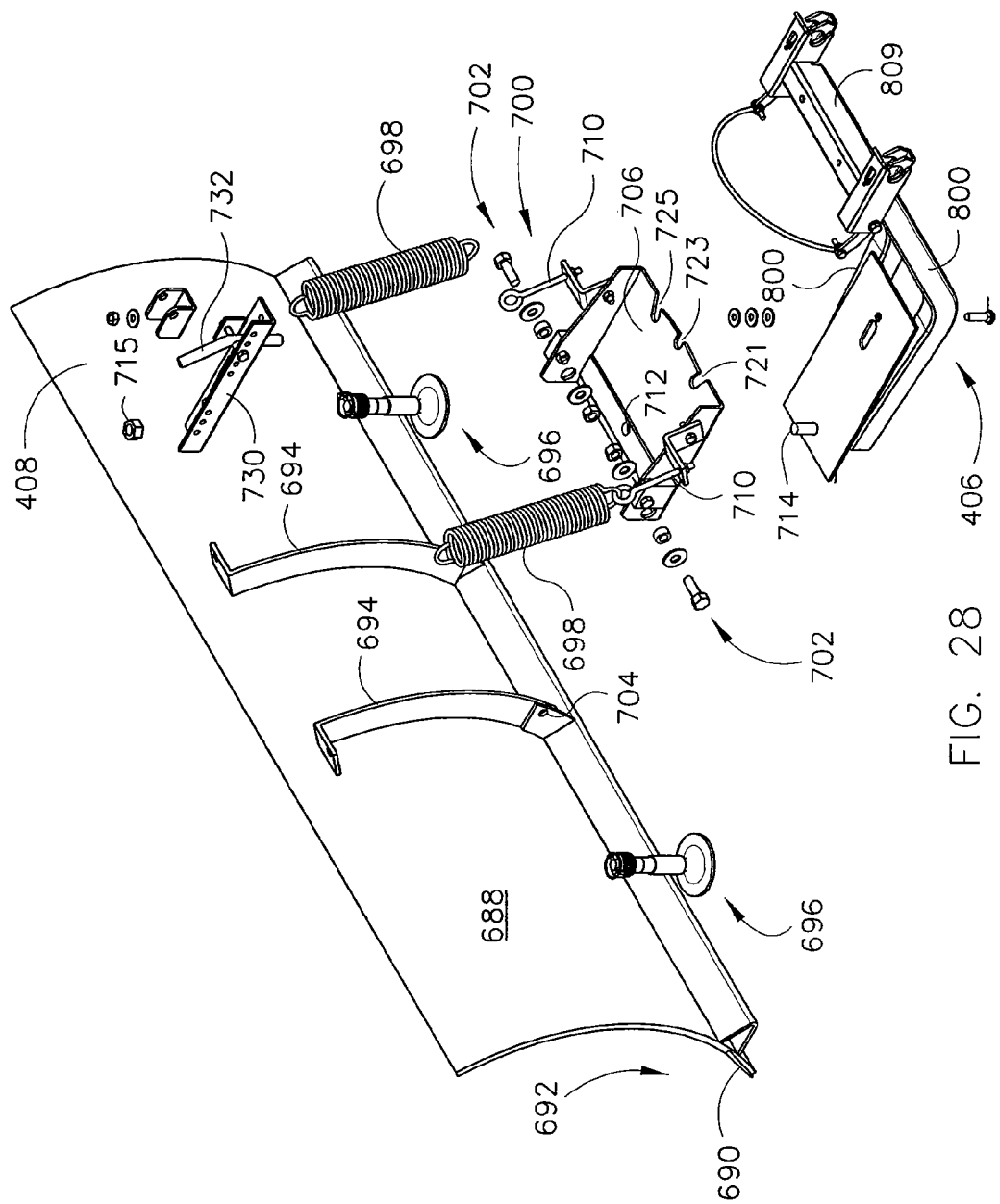
FIG. 28 is a perspective view of the space frame assembly shown in FIG. 27 with a plow implement exploded therefrom.

FIGS. 27 and 28 show space frame 406 disengaged from a clamp assembly so as to be removed from the underlying vehicle and with an exemplary plow implement 408 attached thereto. Plow 408 includes a blade body 688 having wear edge 690 attached to a lower portion 692 thereof. One or more optional ribs 694 extend vertically along a rear surface of blade body 688. A pair of cut edge stop assemblies 696 are secured to generally opposite lateral ends of blade body 688. As is commonly understood, cut edge stop assemblies 696 are used to define a maximum down position of plow 408 relative to a ground surface.

A pair of springs 698 extend between ribs 694 and a plow blade frame bracket or plow frame bracket 706. A pivot pin assembly 702 cooperates with an opening 704 form in each rib 694 and pivotably attaches blade 408 to a plow frame bracket 706. A pair of adjusters 710 extend between each spring 698 and plow frame bracket 706 so as to adjust the bias of maintaining a plow blade 408 in a generally upright orientation. Plow frame bracket 706 includes an opening 712 that cooperates with a pivot pin 714 that extends upward from space frame 406. A nut 715 cooperates with pivot pin 714 so as to secure plow frame bracket 706 to space frame 406 so that plow frame bracket 706 can pivot in a side-to-side manner with respect to space frame 406 and therefore the underlying vehicle.

Figure 20:
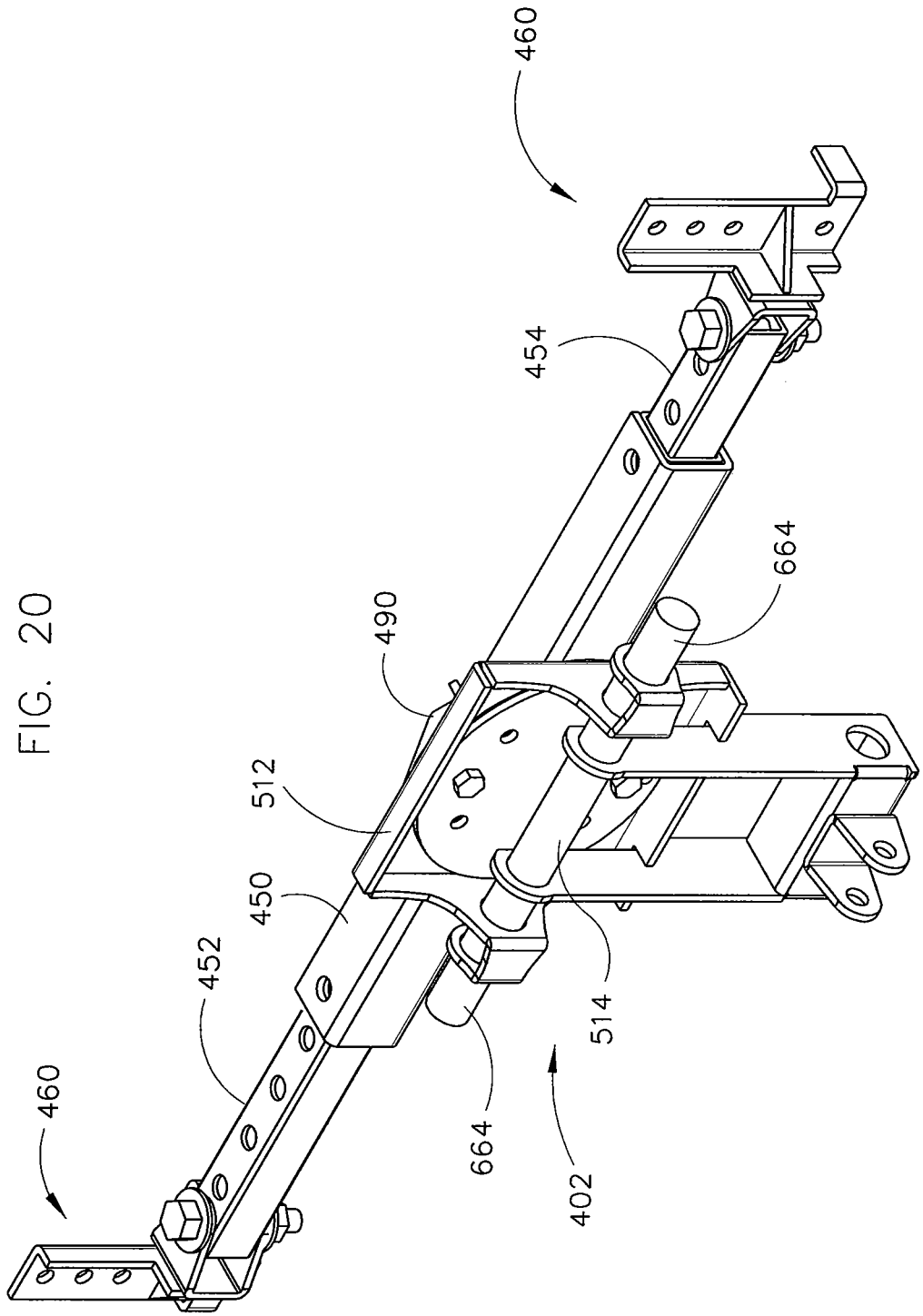
FIG. 20 is a forward perspective view of the clamp assembly of the accessory mounting system shown in FIG. 17.
Figure 21:
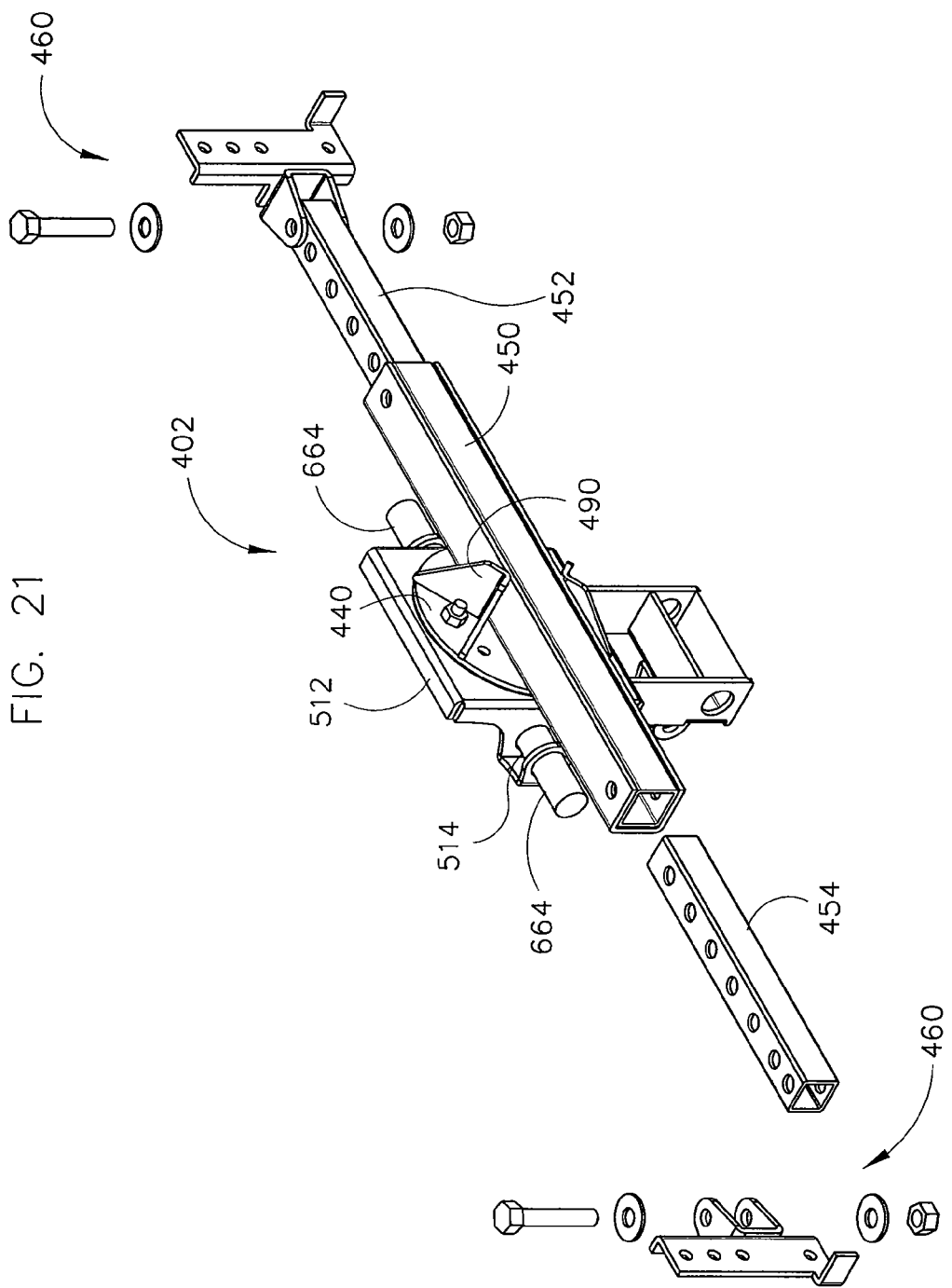
FIG. 21 is a rear perspective and partial exploded view of the clamp assembly shown in FIG. 20.

Referring to FIGS. 27, 28, 31, and 32, frame bracket 706 includes a number of detents 721, 723, 725 that cooperate with a lateral pitch pin assembly 722. Lateral pitch pin assembly 722 includes a pin plate 730, a pitch pin 732, a pivot pin assembly 734, and a spring 736. An opening 738 is formed in a forward facing end 740 of pin plate 730. Opening 738 cooperates with pivot pin 714 extending from space frame 406 as shown in FIG. 20. An elongated groove or channel 742 is formed in a rearward face end 745 of pin plate 730. Pitch pin 732 includes a latching or locking portion 746 and a handle portion 748. Locking portion 746 of pitch pin 732 extends downward from pivot pin assembly 734 and through channel 742 formed in pin plate 730. Handle portion 748 of pitch pin 732 extends in a direction from pivot pin assembly 734 that is generally opposite locking portion 746. Locking portion 746 of pitch pin 732 is maintained in a generally upright orientation so as to interfere with a respective detent 721, 723, 725 formed in plow frame bracket 706.

Pivot pin assembly 734 includes a pin 750, an optional spacer 752, and a fastener 754. Pin 750 cooperates with an opening 756 formed in pitch pin 732 proximate a bend 758 thereof. Pitch pin plate 730 includes an upstanding wall 760 and a tab 762 that generally flank a channel 742. Pivot pin 750 also cooperates with an opening 764 formed in each of upstanding wall 760 and tab 762 so that pitch pin 732 is pivotably supported between wall 760 and tab 762. A first end 768 of spring 736 cooperates with a forward tab 770 that extends from pitch pin plate 730 and a second end 772 of spring 736 cooperates with a tab 774 that extends from pitch pin 732 proximate opening 756. Spring 736 preferably biases locking portion 746 of pitch pin 732 in a forward direction and into a respective detent 721, 723, 725 of plow frame bracket 706. Spring 736 is oriented so that a user can push on handle portion 748 of pitch pin 732 to rotate pitch pin 732 in a forward direction, indicated by arrow 780, so that locking portion 746 of pitch pin 732 can be selectively disengaged from a respective detent 721, 723, 725 of plow frame bracket 706.

When pitch pin 732 is disengaged from detents 721, 723, 725, plow frame bracket 706 can be rotated in a side-to-side direction with respect to space frame 406 via rotation about pivot pin 714. Those skilled in the art will appreciate that plow 408 can be oriented to deposit plowed material to the drive side of vehicle 404 when pitch pin 732 is engaged with detent 721, oriented to deposit plowed material toward the passenger side vehicle 404 when pitch pin 732 is engaged with detent 725, and oriented to deposit material to both sides of vehicle 404 when pitch pin 732 is engaged with detent 723 so that plow 408 is generally perpendicular to the direction of travel of vehicle 404.

Figure 29:
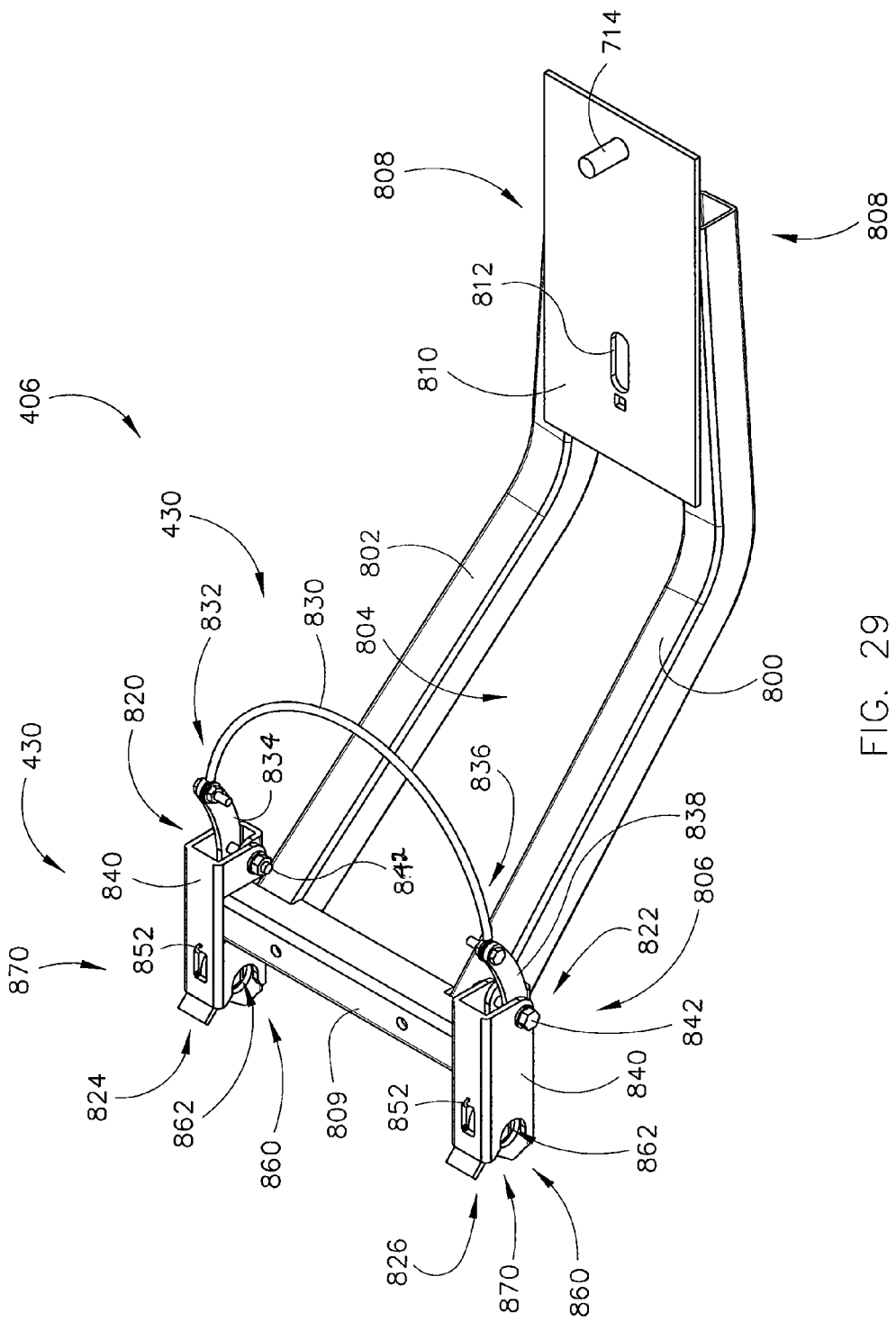
FIG. 29 is a side perspective view of the space frame assembly shown in FIG. 26 with the plow and an implement mounting plate removed therefrom.
Figure 30:
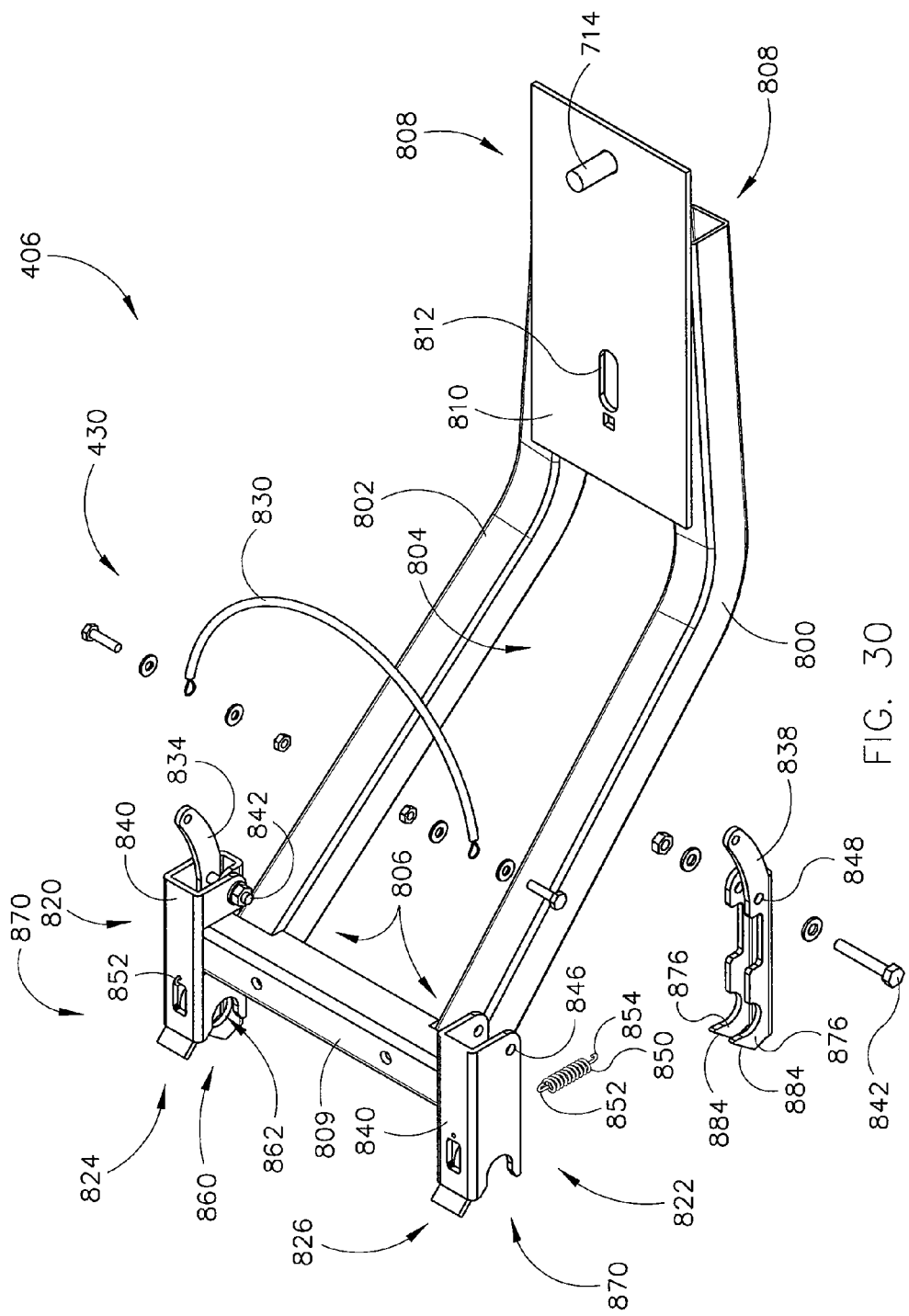
FIG. 30 is a view similar to FIG. 29 and shows a latch assembly partially exploded from the space frame.
Figure 31:
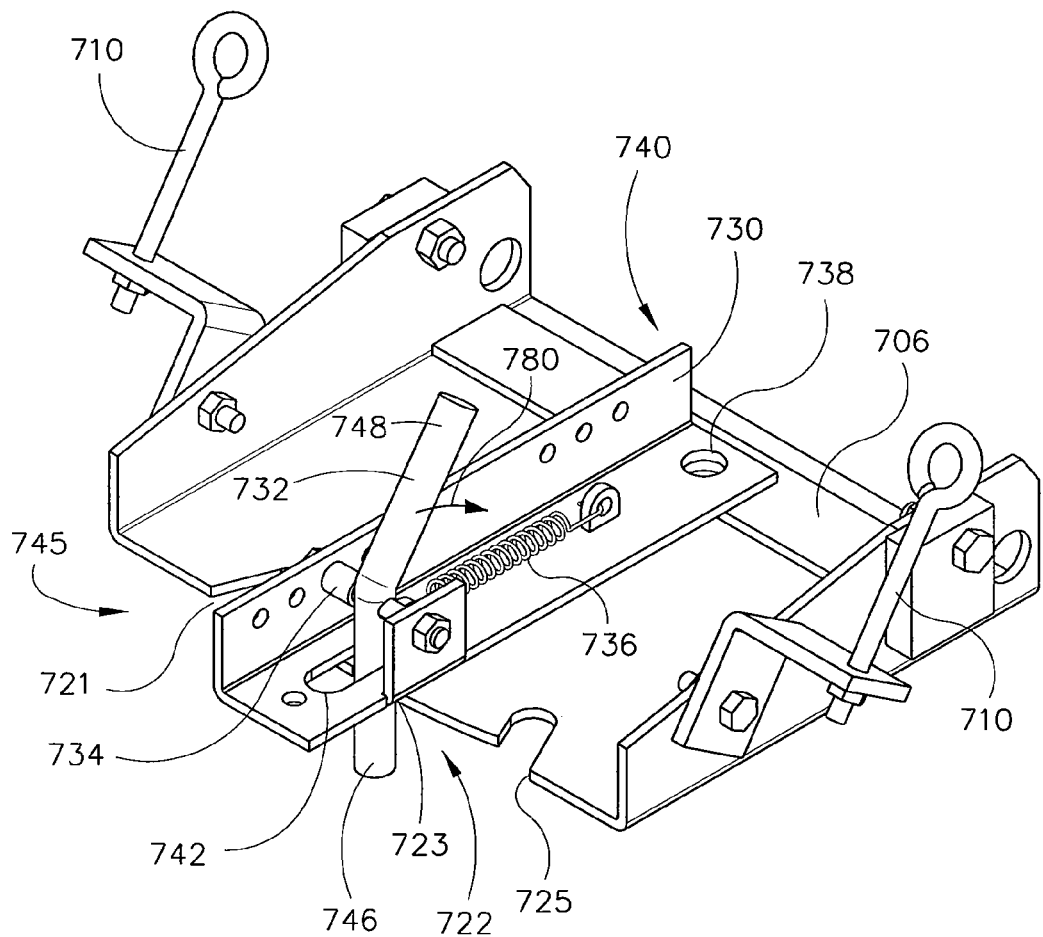
FIG. 31 is a rear perspective view of a pivotable implement mounting plate assembly shown in FIG. 28 and that engages the space frame shown in FIG. 30.
Figure 32:
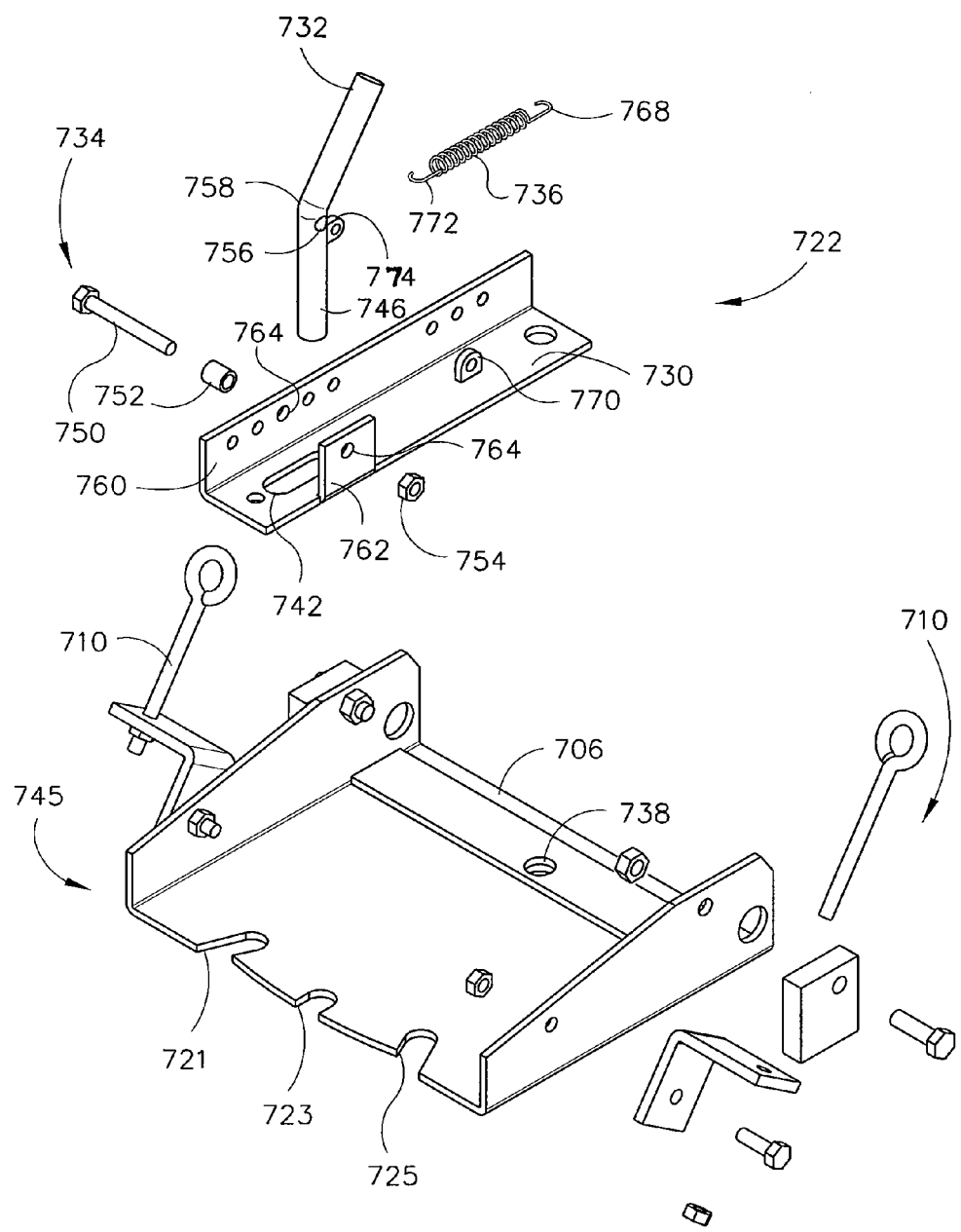
FIG. 32 is a perspective exploded view of the implement mounting plate assembly shown in FIG. 31.

As shown in FIGS. 28, 29, and 30, space frame 406 includes a pair of extension bars 800, 802, that define a gap 804 formed therebetween. Gap 804 allows actuator 416 to be positioned generally between extension bars 800, 802. Each extension bar 800, 802 extends between a first end 806 and a second end 808 and are generally aligned with respect to the longitudinal direction of the underlying vehicle. A cross-member 809 extends between and connects first ends 806 of extension bars 800, 802 and a support plate 810 extends between and connects second ends 808 of extension bars 800, 802. An opening 812 is formed in support plate 810 and positioned generally rearward of pivot pin 714. Opening 812 is generally elongated and configure to cooperate with locking portion 746 of pitch pin 732. When assembled, detents 721, 723, 725 of plow frame bracket 706 are configured to generally overlie opening 812 so that locking portion 746 of pitch pin 732 can remain engaged with support plate 810 independent of its engaged or disengaged orientation relative to detents 721, 723, 725 formed in plow frame bracket 706.

Referring to FIGS. 29 and 30, latch assembly 430 is attached to space frame 406. Preferably, latch assembly 430 includes a first latch 820 and a second latch 822 that are positioned at generally opposite ends 824, 826 of cross-member 809. Latch assembly 430 includes a handle 830 having a first end 832 that is connected to a latch arm 834 of first latch 820 and a second end 836 that is connected to a latch arm 838 of second latch 822. Handle 830 is configured to allow a user to concurrently and single handedly manipulate each latch arm 834, 838. Each latch arm 834, 838 is pivotably connected to a latch guide body 840 of each latch 820, 822. A pivot pin 842 cooperates with aligned openings 846, 848 formed in each latch guide body 840 and pivotably connects the latch arm 834, 838 to the corresponding latch guide body 840.

Each latch 820, 822 of latch assembly 430 includes a spring 850 having a first end 852 that is engaged with the corresponding latch guide body 840 and a second end 854 that is attached to the corresponding latch arm 834, 838. Spring 850 biases each latch arm 834, 838 to a closed position 860 wherein a pivot shaft opening of shaft opening 862 is defined at a rearward facing end 870 of each latch guide body 840. Referring to FIGS. 30 and 33, each shaft opening 862 is defined in part by a catch 876 of each latch arm 834, 838 and a recess 880 formed in each latch guide body 840 that is adjacent catch 876. Preferably, each latch guide body 840 includes a guide flange 882 that cooperates with a guide surface 884 (FIG. 33) formed on a rearward facing side of each catch arm 876. Guide flange 882 and guide surface 884 are oriented such that introduction of shaft 514 of clamp assembly 402, 600 rotates each latch arm 834, 838 in an opening direction, indicated by arrow 888, about pivot pin 842. As shaft 514 is received in shaft opening 862, spring 850 biases each latch arms 834, 838 to a closed position such that each catch arm 876 is positioned generally behind shaft 514. Such a construction fully or nearly fully captures or encircles shaft 514 within shaft opening 862 without user interaction with latch assembly 430.

Referring to FIGS. 15 and 33-37, after space frame 406 has been engaged with clamp assembly 402, 600, a first end 116 of actuator 60, 416 is secured to second portion 502, 604 of a corresponding clamp assembly 402, 600 that is secured to vehicle 404 and second end 112, 420 of actuator 60, 416 is secured to an actuator mounting plate 890 that is attached to pin plate 730 attached to plow frame bracket 706. Each of first and second ends 112, 116 of actuator 60, 416 are pivotably connected to the second portion 502, 604 of the clamp assembly 402, 600 and the plow frame bracket 706.

As shown in FIGS. 34-37, during the initial integration of the accessory mounting system with the underlying vehicle, wiring harness 412 connects actuator 60, 416 to a power system 902 of the underlying vehicle 404. Preferably, harness 412 includes a lead 906 that is configured to allow integration of the accessory mounting system with the functionality of the ignition system 908 of vehicle 404. Harness 412 includes a control 910 that is constructed to be supported by a control lever 912 of vehicle 404 and connected to harness 412. Those skilled in the art will appreciate that control 910 can be provided in any of a number of constructions. Preferably, control 910 is a bidirectional switch wherein one direction is associated with lengthening of actuator 60, 416 and another direction is associated with shortening of actuator 60, 416.

Harness 412 includes another lead 916 that connects actuator 60 to harness 412 and control 910. Harness 412 includes one or more relays 920 that are configured to communicate "up" and "down" instructions received from control 910 to actuator 60. Those skilled in the art will appreciate that the configuration and construction of harness 412 may be tailored for integration with a number of vehicle configurations. Understandably, there may be instances wherein one harness 412 is useable with multiple vehicle configurations.

Referring to FIGS. 34 and 36, a repeatably severable connection is preferably provided between actuator 60 and harness 412. As shown in FIG. 34, in a preferred embodiment, actuator 60 is provided with a male connector 930 and, as shown in FIG. 36, harness 412 is provided with a female connector 932 that removably cooperates with male connector 930. Such a construction allows actuator 60 to remain engaged with the corresponding implement when space frame 406 is removed from the underlying vehicle. Such a construction allows vehicle 404 to be used for its intended use in a manner wherein only the first portion of the clamp assembly remains engaged therewith. Although less preferable, actuator 60 could also be connected to the power system of the vehicle in a more permanent and/or less easily reconnectable manner.

Those skilled in the art will appreciate that mounting system 400, regardless if used with clamp assembly 402 or clamp assembly 600, allows implement 408 to be raised and lowered with respect to the underlying vehicle. Those skilled in the art will also appreciate that the pivotable connection between the first and second portions of each clamp assembly allows vertical side-to-side tipping of implement 408 and that the latch pin assembly 744 allows front-to-back horizontal pitching of implement 408 with respect to the underlying vehicle. Although the pivotable connection provided by clamp assemblies 402, 600 enhances the versatility with respect to the use of implement 408, those skilled in the art will appreciate that not all users will prefer or require such versatility. Furthermore, although mounting system 400 is shown as being used with a plow implement, it is appreciated that mounting system 400 may be useable with one or more of the additional implements as described herein.

As each of the accessory mounting systems described heretofore are constructed to be integrated with an underlying machine, it is envisioned that the present invention, regardless of the specific implement or accessory provided therewith, be provided as a kit. Such a kit preferably includes a two portion clamp assembly or pivot plate assembly. A first member or portion of the clamp assembly is adapted to be secured and positionally fixed with respect to a forward portion of a frame of a vehicle such as a zero-turn mower and a second member or portion of the clamp assembly is configured to be pivotally connected to the first member. The kit includes a space frame having a first end that toollessly and pivotally engages the second member of the pivot plate assembly and an electronic actuator that is adapted to be powered by a power system of the vehicle. Preferably, the electronic actuator includes a first end that is toollessly connectable to the second member of the pivot plate assembly and a second end that is pivotably connectable to the space frame. In a preferred aspect, the kit includes a wiring harness that can be specific to a particular vehicle. It is envisioned that such a kit would allow even novice users to configure their non-highway, off-road, generally residential use vehicles for additional ground care activities associated with raising, lowering, and/or transporting any one of a number of implements with respect to the area to be tended. The implement mounting systems according to the present invention are highly versatile and provide an implement platform that is cost effective and can easily be incorporated with a number of vehicle configurations including the prolific zero-turn lawnmower.

The present invention has been described in terms of various embodiments, and it is recognized that equivalents, alternatives and modifications, aside from those expressly stated, are possible and within the scope of the appending claims.

What is claimed is:

1. A zero-turn lawnmower accessory system comprising:
   a clamp assembly pivotably secured to a front portion of a frame of a zero-turn lawnmower;
   a space frame assembly pivotably supported by the clamp assembly and extending in a forward direction relative thereto;
   a ground care implement supported by the space frame;
   an electric ram having a first end attached to the clamp assembly and a second end attached to the space frame such that operation of the electric ram changes an elevation of the ground care implement relative to the frame of the zero-turn lawnmower; and
   the clamp assembly further comprises a pivot assembly having a first portion that remains fixed relative to the frame and a second portion having the space frame attached thereto and which is pivotable with respect to the first portion, the first portion further comprising a disk assembly having a center disk that is enclosed by the second portion in a radial direction and a forward and a rearward disk that flank the center disk.

2. The zero-turn lawnmower accessory system of claim 1 wherein the ground care implement is further defined as at least one of a plow, an aerator, a dethatcher, a sprayer, a broadcast spreader, a drop spreader, a rototiller, and a lift jack frame.

3. The zero-turn lawnmower accessory system of claim 1 further comprising a bearing disk positioned between the center disk and each of the forward disk and rearward disk.

4. The zero-turn lawnmower accessory system of claim 1 wherein the second portion is 360 degrees rotatable about the center disk.

5. The zero-turn lawnmower accessory system of claim 1 further comprising a latch assembly attached to the space frame and configured to engage the clamp assembly to toollessly secure the space frame to the clamp assembly.

6. The zero-turn lawnmower accessory system of claim 5 wherein the space frame is pivotable relative to the clamp assembly about a lateral axis defined by the latch assembly.

7. The zero-turn lawnmower accessory system of claim 5 wherein the latch assembly includes a first latch and a second latch that are both operable by a common handle.

8. An off-road vehicle implement mounting system comprising:
   a clamp assembly adapted to mount to a front portion of a frame of a vehicle, the clamp assembly comprising:
      a pivot mount assembly having a first portion that is positionally fixed with respect to the vehicle and a second portion that is pivotable with respect to the frame of the vehicle about an axis that is generally aligned with a longitudinal axis of the vehicle;
   a space frame having a first end that is pivotably connected to the pivot mount assembly so that the space frame pivots about an axis that is oriented in a crossing direction with respect to the longitudinal axis of the vehicle;
   a ground treatment implement attached to the space frame at a location forward of the first end of the space frame with respect to the vehicle;
   an electric actuator having a first end attached to the second portion of the clamp assembly and a second end attached to the space frame and operable to selectively raise and lower the ground treatment implement with respect to the vehicle and independent of an orientation of the second portion of the pivot mount assembly relative to the vehicle; and
   a latch assembly that is biased to a closed position and removably connects the space frame to the pivot mount assembly, the latch assembly including a first latch and a second latch that engage generally opposite lateral sides of a shaft attached to the pivot mount assembly and a single handle that concurrently manipulates both first latch and the second latch.

9. The off-road vehicle implement mounting system of claim 8 wherein the implement is at least one of a plow, an aerator, a dethatcher, a sprayer, a drop spreader, a broadcast spreader, and a rototiller.

10. The off-road vehicle implement mounting system of claim 8 wherein the vehicle is one of an ATV, a UTV, a lawnmower, and a zero-turn lawnmower.

11. The off-road vehicle implement mounting system of claim 8 wherein the latch assembly is attached to and supported by the space frame and removably engages the pivot mount assembly.

12. The off-road vehicle implement mounting system of claim 8 wherein the second portion of the pivot mount assembly is fully rotatable with respect to the first portion of the pivot mount assembly.

13. The off-road vehicle implement mounting system of claim 8 wherein the pivot mount assembly further comprising an adjustable mounting bracket having pair of mount arms that engage the frame at opposite ends thereof and a center bracket that can be secured to each mounting arm at a number of positions.

14. A kit for mounting ground treatment implements to a zero-turn mower, the kit comprising:
   a pivot plate assembly having a first member adapted to be secured and positionally fixed with respect to a forward portion of a frame of a zero-turn mower and a second member that is pivotally connected to the first member, the pivot plate assembly including a pivot plate that is radially captured by the second member of the pivot plate assembly and flanked by a pair of capture plates;
   a space frame having a first end that toollessly and pivotally engages the second member of the pivot plate assembly such that the second member is disposed between the first member and the space frame and a second end that is adapted to support an implement; and
   an electronic actuator adapted to be powered by a power system of the zero-turn mower; the electronic actuator having a first end that is toollessly connectable to the second member of the pivot plate assembly and a second end that is connectable to the space frame at a location offset in a forward direction from the pivot plate assembly such that operation of the electronic actuator manipulates the orientation of the space frame relative to the pivot plate assembly.

15. The kit of claim 14 wherein the first member of the pivot plate assembly includes a stub tube that cooperates with a receiver attached to a zero-turn mower.

16. The kit of claim 14 further comprising at least one bearing disk adapted to be disposed between the pivot plate and each capture plate.

* * * * *